US009038919B2

(12) United States Patent  
Link et al.

(10) Patent No.: US 9,038,919 B2  
(45) Date of Patent: May 26, 2015

(54) FORMATION AND CONTROL OF FLUIDIC SPECIES

(75) Inventors: Darren Roy Link, Guilford, CT (US); David A. Weitz, Bolton, MA (US); Manuel Marquez-Sanchez, Lincolnshire, IL (US); Zhengdong Cheng, College Station, TX (US)

(73) Assignee: President and Fellows of Harvard College, Cambridge, MA (US)

( * ) Notice: Subject to any disclaimer, the term of this patent is extended or adjusted under 35 U.S.C. 154(b) by 0 days.

(21) Appl. No.: 11/246,911

(22) Filed: Oct. 7, 2005

(65) Prior Publication Data

US 2006/0163385 A1 Jul. 27, 2006

Related U.S. Application Data

(63) Continuation of application No. PCT/US2004/010903, filed on Apr. 9, 2004.

(60) Provisional application No. 60/461,954, filed on Apr. 10, 2003.

(51) Int. Cl.
*B05B 5/057* (2006.01)
*B01F 5/06* (2006.01)
(Continued)

(52) U.S. Cl.
CPC ........... *B01F 5/0682* (2013.01); *B01F 13/0062* (2013.01); *B01F 13/0071* (2013.01);
(Continued)

(58) Field of Classification Search
CPC .............. B01F 13/0071; B01F 5/0682; B01F 13/0062; B01F 13/0076; B01F 13/0005; B05B 5/03; B05B 7/061
USPC ........... 239/3, 8, 704, 423, 424, 428, 10, 433, 239/434
See application file for complete search history.

(56) References Cited

U.S. PATENT DOCUMENTS 2,692,800 A * 10/1954 Nichols et. al. ................ 137/14
(Continued)

FOREIGN PATENT DOCUMENTS

AU 200039611 10/2000
(Continued)

OTHER PUBLICATIONS

Grasland-Mongrain, et al., "Droplet coalescence in microfluidic devices," Jan.-Jul. 2003, pp. 1-30.
(Continued)

*Primary Examiner* — Jason Boeckmann
(74) *Attorney, Agent, or Firm* — Wolf, Greenfield & Sacks, P.C.

(57) ABSTRACT

This invention generally relates to systems and methods for the formation and/or control of fluidic species, and articles produced by such systems and methods. In some cases, the invention involves unique fluid channels, systems, controls, and/or restrictions, and combinations thereof. In certain embodiments, the invention allows fluidic streams (which can be continuous or discontinuous, i.e., droplets) to be formed and/or combined, at a variety of scales, including microfluidic scales. In one set of embodiments, a fluidic stream may be produced from a channel, where a cross-sectional dimension of the fluidic stream is smaller than that of the channel, for example, through the use of structural elements, other fluids, and/or applied external fields, etc. In some cases, a Taylor cone may be produced. In another set of embodiments, a fluidic stream may be manipulated in some fashion, for example, to create tubes (which may be hollow or solid), droplets, nested tubes or droplets, arrays of tubes or droplets, meshes of tubes, etc. In some cases, droplets produced using certain embodiments of the invention may be charged or substantially charged, which may allow their further manipulation, for instance, using applied external fields. Non-limiting examples of such manipulations include producing charged droplets, coalescing droplets (especially at the microscale), synchronizing droplet formation, aligning molecules within the droplet, etc. In some cases, the droplets and/or the fluidic streams may include colloids, cells, therapeutic agents, and the like.

8 Claims, 16 Drawing Sheets

(51) Int. Cl.
  *B01F 13/00*  (2006.01)
  *B01J 2/04*  (2006.01)
  *B05B 5/03*  (2006.01)
  *B05B 7/06*  (2006.01)

(52) U.S. Cl.
  CPC ............... *B01F13/0076* (2013.01); *B01J 2/04* (2013.01); *B05B 5/03* (2013.01); *B05B 7/061* (2013.01); *B01F 2215/0431* (2013.01)

(56) References Cited

U.S. PATENT DOCUMENTS

| | | | |
|---|---|---|---|
| 3,816,331 A | 6/1974 | Brown et al. | |
| 3,980,541 A | 9/1976 | Aine | |
| 4,059,552 A | 11/1977 | Zweigle et al. | |
| 4,279,345 A | 7/1981 | Allred | |
| 4,508,265 A * | 4/1985 | Jido | 239/3 |
| 4,618,476 A | 10/1986 | Columbus | |
| 4,795,330 A | 1/1989 | Noakes et al. | |
| 4,829,996 A | 5/1989 | Noakes et al. | |
| 4,853,336 A | 8/1989 | Saros et al. | |
| 4,865,444 A | 9/1989 | Green et al. | |
| 4,931,225 A | 6/1990 | Cheng | |
| 4,996,004 A | 2/1991 | Bucheler et al. | |
| 5,149,625 A | 9/1992 | Church et al. | |
| 5,204,112 A | 4/1993 | Hope et al. | |
| 5,378,957 A | 1/1995 | Kelly | |
| 5,452,955 A | 9/1995 | Lundstrom | |
| 5,512,131 A | 4/1996 | Kumar et al. | |
| 5,617,997 A | 4/1997 | Kobayashi et al. | |
| 5,681,600 A | 10/1997 | Antinone et al. | |
| 5,762,775 A * | 6/1998 | DePaoli et al. | 204/554 |
| 5,851,769 A | 12/1998 | Gray et al. | |
| 5,868,322 A | 2/1999 | Loucks et al. | |
| 5,882,680 A | 3/1999 | Suzuki et al. | |
| 5,935,331 A | 8/1999 | Naka et al. | |
| 5,942,443 A | 8/1999 | Parce et al. | |
| 5,980,936 A | 11/1999 | Krafft et al. | |
| 6,046,056 A | 4/2000 | Parce et al. | |
| 6,116,516 A | 9/2000 | Ganan-Calvo | |
| 6,119,953 A | 9/2000 | Ganan-Calvo et al. | |
| 6,120,666 A | 9/2000 | Jacobson et al. | |
| 6,130,098 A | 10/2000 | Handique et al. | |
| 6,149,789 A | 11/2000 | Benecke et al. | |
| 6,150,180 A | 11/2000 | Parce et al. | |
| 6,174,469 B1 | 1/2001 | Ganan-Calvo | |
| 6,177,479 B1 | 1/2001 | Nakajima et al. | |
| 6,187,214 B1 | 2/2001 | Ganan-Calvo | |
| 6,189,803 B1 | 2/2001 | Ganan-Calvo | |
| 6,196,525 B1 | 3/2001 | Ganan-Calvo | |
| 6,197,835 B1 | 3/2001 | Ganan-Calvo | |
| 6,221,654 B1 | 4/2001 | Quake et al. | |
| 6,227,466 B1 * | 5/2001 | Hartman et al. | 239/704 |
| 6,234,402 B1 | 5/2001 | Ganan-Calvo | |
| 6,241,159 B1 | 6/2001 | Ganan-Calvo et al. | |
| 6,248,378 B1 | 6/2001 | Ganan-Calvo | |
| 6,252,129 B1 | 6/2001 | Coffee | |
| 6,267,858 B1 | 7/2001 | Parce et al. | |
| 6,274,337 B1 | 8/2001 | Parce et al. | |
| 6,296,020 B1 | 10/2001 | McNeely | |
| 6,299,145 B1 | 10/2001 | Ganan-Calvo | |
| 6,301,055 B1 | 10/2001 | Legrand et al. | |
| 6,306,659 B1 | 10/2001 | Parce et al. | |
| 6,355,198 B1 | 3/2002 | Kim et al. | |
| 6,357,670 B2 | 3/2002 | Ganan-Calvo | |
| 6,386,463 B1 | 5/2002 | Ganan-Calvo | |
| 6,394,429 B2 | 5/2002 | Ganan-Calvo | |
| 6,399,389 B1 | 6/2002 | Parce et al. | |
| 6,405,936 B1 * | 6/2002 | Ganan-Calvo | 239/8 |
| 6,408,878 B2 | 6/2002 | Unger et al. | |
| 6,429,025 B1 | 8/2002 | Parce et al. | |
| 6,432,148 B1 | 8/2002 | Ganan-Calvo | |
| 6,432,630 B1 | 8/2002 | Blankenstein | |
| 6,450,189 B1 | 9/2002 | Ganan-Calvo | |
| 6,464,886 B2 | 10/2002 | Ganan-Calvo | |
| 6,489,103 B1 | 12/2002 | Griffiths et al. | |
| 6,506,609 B1 | 1/2003 | Wada et al. | |
| 6,508,988 B1 | 1/2003 | Van Dam et al. | |
| 6,520,425 B1 * | 2/2003 | Reneker | 239/294 |
| 6,540,895 B1 | 4/2003 | Spence et al. | |
| 6,554,202 B2 | 4/2003 | Ganan-Calvo | |
| 6,557,834 B2 | 5/2003 | Ganan-Calvo | |
| 6,558,944 B1 | 5/2003 | Parce et al. | |
| 6,558,960 B1 | 5/2003 | Parce et al. | |
| 6,560,030 B2 | 5/2003 | Legrand et al. | |
| 6,592,821 B1 | 7/2003 | Wada et al. | |
| 6,608,726 B2 | 8/2003 | Legrand et al. | |
| 6,610,499 B1 | 8/2003 | Fulwyler et al. | |
| 6,614,598 B1 | 9/2003 | Quake et al. | |
| 6,630,353 B1 | 10/2003 | Parce et al. | |
| 6,645,432 B1 | 11/2003 | Anderson et al. | |
| 6,660,252 B2 | 12/2003 | Matathia et al. | |
| 6,752,922 B2 | 6/2004 | Huang et al. | |
| 6,790,328 B2 | 9/2004 | Jacobson et al. | |
| 6,806,058 B2 | 10/2004 | Jesperson et al. | |
| 6,890,487 B1 | 5/2005 | Sklar et al. | |
| 6,935,768 B2 | 8/2005 | Lowe et al. | |
| 7,041,481 B2 | 5/2006 | Anderson et al. | |
| 7,068,874 B2 | 6/2006 | Wang et al. | |
| 7,115,230 B2 | 10/2006 | Sundararajan et al. | |
| 7,204,431 B2 * | 4/2007 | Li et al. | 239/3 |
| 7,268,167 B2 | 9/2007 | Higuchi et al. | |
| 7,294,503 B2 | 11/2007 | Quake et al. | |
| 7,708,949 B2 | 5/2010 | Stone et al. | |
| RE41,780 E | 9/2010 | Anderson et al. | |
| 7,897,044 B2 | 3/2011 | Hoyos et al. | |
| 7,968,287 B2 | 6/2011 | Griffiths et al. | |
| 8,287,711 B2 | 10/2012 | Pollack et al. | |
| 8,337,778 B2 | 12/2012 | Stone et al. | |
| 8,765,485 B2 | 7/2014 | Link et al. | |
| 2001/0050881 A1 * | 12/2001 | Depaoli et al. | 366/167.1 |
| 2002/0004532 A1 | 1/2002 | Matathia et al. | |
| 2002/0008028 A1 | 1/2002 | Jacobson et al. | |
| 2002/0058332 A1 | 5/2002 | Quake et al. | |
| 2002/0119459 A1 | 8/2002 | Griffiths | |
| 2003/0015425 A1 | 1/2003 | Bohm et al. | |
| 2003/0039169 A1 | 2/2003 | Ehrfeld et al. | |
| 2003/0124586 A1 | 7/2003 | Griffiths et al. | |
| 2003/0183525 A1 | 10/2003 | Elrod et al. | |
| 2004/0027915 A1 | 2/2004 | Lowe et al. | |
| 2004/0031688 A1 | 2/2004 | Shenderov | |
| 2004/0096515 A1 | 5/2004 | Bausch et al. | |
| 2004/0182712 A1 | 9/2004 | Basol | |
| 2005/0032238 A1 | 2/2005 | Karp et al. | |
| 2005/0032240 A1 | 2/2005 | Lee et al. | |
| 2005/0103690 A1 | 5/2005 | Kawano et al. | |
| 2005/0172476 A1 | 8/2005 | Stone et al. | |
| 2005/0183995 A1 | 8/2005 | Deshpande et al. | |
| 2005/0207940 A1 | 9/2005 | Butler et al. | |
| 2005/0221339 A1 | 10/2005 | Griffiths et al. | |
| 2005/0272159 A1 | 12/2005 | Ismagilov et al. | |
| 2006/0051329 A1 | 3/2006 | Lee et al. | |
| 2006/0078888 A1 | 4/2006 | Griffiths et al. | |
| 2006/0078893 A1 | 4/2006 | Griffiths et al. | |
| 2006/0108012 A1 | 5/2006 | Barrow et al. | |
| 2006/0163385 A1 | 7/2006 | Link et al. | |
| 2006/0169800 A1 | 8/2006 | Rosell et al. | |
| 2006/0263888 A1 | 11/2006 | Fritz et al. | |
| 2007/0003442 A1 | 1/2007 | Link et al. | |
| 2007/0045117 A1 | 3/2007 | Pollack et al. | |
| 2007/0054119 A1 | 3/2007 | Garstecki et al. | |
| 2007/0056853 A1 | 3/2007 | Aizenberg et al. | |
| 2007/0092914 A1 | 4/2007 | Griffiths et al. | |
| 2007/0172873 A1 | 7/2007 | Brenner et al. | |
| 2007/0195127 A1 | 8/2007 | Ahn et al. | |
| 2008/0003142 A1 | 1/2008 | Link et al. | |
| 2008/0004436 A1 | 1/2008 | Tawfik et al. | |
| 2008/0014589 A1 | 1/2008 | Link et al. | |
| 2008/0023330 A1 | 1/2008 | Viovy et al. | |
| 2009/0012187 A1 | 1/2009 | Chu et al. | |
| 2009/0068170 A1 | 3/2009 | Weitz et al. | |
| 2009/0131543 A1 | 5/2009 | Weitz et al. | |
| 2010/0022414 A1 | 1/2010 | Link et al. | |
| 2010/0130369 A1 | 5/2010 | Shenderov et al. | |

(56) References Cited

U.S. PATENT DOCUMENTS

| 2010/0137163 A1 | 6/2010 | Link et al. |
| 2010/0172803 A1 | 7/2010 | Stone et al. |
| 2010/0173394 A1 | 7/2010 | Colston, Jr. et al. |
| 2012/0015382 A1 | 1/2012 | Weitz et al. |
| 2014/0037514 A1 | 2/2014 | Stone et al. |
| 2014/0305799 A1 | 10/2014 | Link et al. |

FOREIGN PATENT DOCUMENTS

| DE | 43 08 839 A1 | 9/1994 |
| DE | 199 61 257 A1 | 7/2001 |
| DE | 100 15 109 A1 | 10/2001 |
| DE | 100 41 823 A1 | 3/2002 |
| EP | 0249007 A2 | 12/1987 |
| EP | 0718038 B1 | 8/1992 |
| EP | 1362634 A1 | 11/2003 |
| EP | 1741482 A2 | 1/2007 |
| GB | 1 446 998 | 8/1976 |
| GB | 2 097 692 A | 11/1982 |
| JP | 53-072016 A | 6/1978 |
| JP | S62-254830 A | 11/1987 |
| JP | 3-232525 | 10/1991 |
| JP | H08-071489 A | 3/1996 |
| JP | 8-153669 | 6/1996 |
| JP | 10-217477 | 8/1998 |
| JP | H11-276802 A | 10/1999 |
| JP | 2001-301154 | 10/2001 |
| JP | 2001-517353 A | 10/2001 |
| JP | 2003-501257 A | 1/2003 |
| JP | 2003-507162 A | 2/2003 |
| JP | 2005-037346 A | 2/2005 |
| JP | 2010-198393 A | 9/2010 |
| WO | WO 91/07772 A1 | 5/1991 |
| WO | WO 96/29629 A2 | 3/1996 |
| WO | WO 97/23140 A1 | 7/1997 |
| WO | WO 97/28556 A1 | 8/1997 |
| WO | WO 99/61888 A2 | 12/1999 |
| WO | WO 00/54735 A1 | 3/2000 |
| WO | WO 00/47322 A2 | 8/2000 |
| WO | WO 00/52455 A1 | 9/2000 |
| WO | WO 00/70080 A1 | 11/2000 |
| WO | WO 00/76673 A1 | 12/2000 |
| WO | WO 01/12327 A1 | 2/2001 |
| WO | WO 01/68257 A1 | 9/2001 |
| WO | WO 01/69289 A2 | 9/2001 |
| WO | WO 01/72431 | 10/2001 |
| WO | WO 01/80283 A1 | 10/2001 |
| WO | WO 01/89787 A2 | 11/2001 |
| WO | WO 01/89788 A2 | 11/2001 |
| WO | WO 01/94635 A2 | 12/2001 |
| WO | 02/13786 A2 | 2/2002 |
| WO | WO 02/16017 A2 | 2/2002 |
| WO | WO 02/18949 A2 | 3/2002 |
| WO | WO 02/47665 A2 | 6/2002 |
| WO | WO 02/060275 | 8/2002 |
| WO | WO 02/060591 | 8/2002 |
| WO | WO02/068104 * | 9/2002 |
| WO | WO 02/103011 A2 | 12/2002 |
| WO | WO 03/011443 A2 | 2/2003 |
| WO | WO 2004/002627 A2 | 1/2004 |
| WO | WO 2004/002627 A3 | 1/2004 |
| WO | WO 2004/038363 A2 | 5/2004 |
| WO | WO 2004/071638 A2 | 8/2004 |
| WO | WO 2004/091763 A2 | 10/2004 |
| WO | WO 2004/102204 A1 | 11/2004 |
| WO | WO 2004/103565 A2 | 12/2004 |
| WO | WO 2005/002730 A1 | 3/2005 |
| WO | WO 2005/049787 A2 | 6/2005 |
| WO | WO 2005/103106 A1 | 11/2005 |
| WO | WO 2006/002641 A1 | 1/2006 |
| WO | WO 2006/078841 A1 | 7/2006 |
| WO | WO 2006/096571 A2 | 9/2006 |
| WO | WO 2006/101851 A2 | 9/2006 |
| WO | WO 2007/081385 | 7/2007 |
| WO | WO 2007/089541 A2 | 8/2007 |
| WO | WO 2007/114794 A1 | 10/2007 |
| WO | WO 2007/133710 A2 | 11/2007 |
| WO | WO 2007/138178 A2 | 12/2007 |
| WO | WO 2008/121342 A2 | 10/2008 |
| WO | WO 2008/134153 A1 | 11/2008 |
| WO | WO 2012/048341 A1 | 4/2012 |

OTHER PUBLICATIONS

International Search Report dated Sep. 10, 2007 in PCT/US2007/002063.

Griffiths, A.D. et al., "Miniaturising the laboratory in emulsion droplets," *Trend Biotech*, 12:1-8, 2006.

Nisisako, T. et al., "Controlled formulation of monodisperse double emulsions in a multiple-phase microfluidic system," *Soft Matter*, 2005, 1, 23-27.

International Search Report dated Jan. 9, 2006 in PCT/US06/007772.

Written Opinion dated Jan. 9, 2006 in PCT/US06/007772.

Ahn, K., et al., "Dielectrophoretic manipulation of drops for high-speed microfluidic sorting devices," *Applied Physics Letters*, 2006, 88, 024104-1-024104-3.

Ando, S., et al., "PLGA Microspheres Containing Plasmid DNA: Preservation of Supercoiled DNA via Cryopreparation and Carbohydrate Stabilization," *Journal of Pharmaceutical Sciences*, vol. 88, No. 1, pp. 126-130 (1999).

Anna, S.L., et al., "Formation of dispersions using "flow focusing" in microchannels," *Applied Physics Letters*, vol. 82, No. 3, pp. 364-366 (2003).

Benichou, A., et al., "Double Emulsions Stabilized by New Molecular Recognition Hybrids of Natural Polymers," *Polym. Adv. Tehcnol.*, vol. 13, pp. 1019-1031 (2002).

Bibette, J., et al., "Emulsions: basic principles", Rep. Prog. Phys.. 62 (1999) 969-1033.

Chao, W., et al., "Control of Concentration and Volume Gradients in Microfluidic Droplet Arrays for Protein Crystallization Screening", 26th Annual International Conference of the IEEE Engineering in Medicine and Biology Society, Sep. 1-5, 2004, Francisco, California.

Chao, W., et al., "Droplet Arrays in Microfluidic Channels for Combinatorial Screening Assays", Hilton Head 2004: A Solid State Sensor, Actuator and Microsystems Workshop, Hilton Head Island, South Carolina, Jun. 6-10, 2004.

Chen, C.C., et al., "Microfluidic Switch for Embryo and Cell Sorting," The 12th International Conference on Solid State Sensors, Actuators, and Microsystems, Boston, MA Jun. 8-12, 2003 *Transducers*, vol. 1, pp. 659-662 (2003).

Chen, L.X., et al., "Capturing a Photoexcited Molecular Structure Through Time-Domain X-ray Absorption Fine Structure," *Science*, vol. 292, pp. 262-264 (2001).

Cheng, Z., et al., "Electro flow focusing in microfluidic devices," Microfluidics Poster, presented at Deas, "Frontiers in Nanoscience," presented Apr. 10, 2003.

Chiba, M., et al., "Controlled protein delivery from biodegradable tyrosine-containing poly(anhydride-co-imide) microspheres," *Biomaterials*, vol. 18, pp. 893-901 (1997).

Cohen, S., et al., "Controlled Delivery Systems for Proteins Based on Poly(Lactic/Glycolic Acid) Microspheres," *Pharmaceutical Research*, vol. 8, No. 6, pp. 713-720 (1991).

Collins, J., et al., "Microfluidic flow transducer based on the measurement of electrical admittance", *Lab on a Chip*, vol. 4, 2004.

Collins, J., et al., "Optimization of Shear Driven Droplet Generation in a Microfluidic Device", ASME International Mechanical Engineering Congress and R&D Expo 2003, Washington.

Cortesi, R., et al., "Production of lipospheres as carriers for bioactive compounds," *Biomaterials*, vol. 23, pp. 2283-2294 (2002).

Dinsmore, A.D., et al., "Colloidosomes: Selectively Permeable Capsules Composed of Colloidal Particles", Science, Nov. 2002, 298:1006-1009.

Dinsmore, A.D., et al., "Colloidosomes: Selectively-Permeable Capsules Composed of Colloidal Particles", Supplementary Material.

Dove, A., et al., *Nature Biotechnology*, Dec. 2002, 20:1213.

Edris, A., et al., "Encapsulation of orange oil in a spray dried double emulsion," *Nahrung/Food*, vol. 45, No. 2, pp. 133-137 (2001).

(56) References Cited

OTHER PUBLICATIONS

Eow, J.S., et al. "Electrostatic and hydrodynamic separation of aqueous drops in a flowing viscous oil," *Chemical Engineering and Processing*, vol. 41, pp. 649-657 (2002).

Eow, J.S., et al., "Electrocoalesce-separators for the separation of aqueous drops from a flowing dielectric viscous liquid," *Separation and Purification Technology*, vol. 29, pp. 63-77 (2002).

Eow, J.S., et al., "Electrostatic enhancement of coalescence of water droplets in oil: a review of the technology," *Chemical Engineering Journal*, vol. 85, pp. 357-368 (2002).

Eow, J.S., et al., "Motion, deformation and break-up of aqueous drops in oils under high electric field strengths," *Chemical Engineering and Processing*, vol. 42, pp. 259-272 (2003).

Eow, J.S., et al., "The bahaviour of a liquid-liquid interface and drop-interface coalescence under the influence of an electric field," *Colloids and Surfaces A: Physiochem. Eng. Aspects*, pp. 101-123 (2003).

Fisher, J.S., et al., "Cell Encapsulation on a Microfluidic Platform," The Eighth International Conference on Miniaturised Systems for Chemistry and Life Sciences, MicroTAS, Sep. 26-30, 2004, Malmo, Sweden.

Fu, A.Y., et al., "A microfabricated fluorescence-activated cell sorter," *Nature Biotechnology*, vol. 17, pp. 1109-1111 (1999).

Gallarate, M., et al., "On the stability of ascorbic acid in emulsified systems for topical and cosmetic use," *International Journal of Pharmaceutics*, vol. 188, pp. 233-241 (1999).

Ganan-Calvo, A., "Generation of Steady Liquid Microthreads and MicronSized Monodisperse Sprays in Gas Streams," *Physical Review Letters*, vol. 80, No. 2 (1998).

Ganan-Calvo, A.M., "Perfectly monodisperse micro-bubble production by novel mechanical means. Scaling laws," *American Physical Society 53rd Annual Meeting of the Division of Fluid Dynamics*, Nov. 19-21, 2000.

Ganan-Calvo, A.M., "Perfectly Monodisperse Microbubbling by Capillary Flow Focusing," *Physical Review Letters*, vol. 87, No. 27, pp. 274501-1 to 274501-4 (2001).

Griffiths, A., et al., "Man-made enzymes—from design to in vitro compartmentalisation," *Current Opinion in Biotechnology*, vol. 11, pp. 338-353 (2000).

Hadd, A.G., et al., "Microchip Device for Performing Enzyme Assays," *Anal. Chem.*, vol. 69, pp. 3407-3412 (1997).

Hanes, J., et al., "Degradation of porous poly(anhydride-*co*-imide) microspheres and implication for controlled macromolecule delivery," *Biomaterials*, vol. 19, pp. 163-172 (1998).

Hayward, R.C., et al., "Dewetting Instability during the Formation of Polymersomes from Block-Copolymer-Stabilized Double Emulsions," *Langmuir*, vol. 22, No. 10, pp. 4457-4461 (2006).

Hung, L.H., et al., "Controlled Droplet Fusion in Microfluidic Devices", MicroTAS, Sep. 26-30, 2004, Malmo, Sweden.

Hung, L.H., et al., "Optimization of Droplet Generation by controlling PDMS Surface Hydrophobicity," 2004 ASME International Mechanical Engineering Congres and RD&D Expo, Nov. 13-19, 2004, Anaheim, CA.

Jang, J.H., et al., "Controllable delivery of non-viral DNA from porous scaffold," *Journal of Controlled Release*, vol. 86, pp. 157-168 (2003).

Jo, Y.S., et al, "Encapsulation of Bovine Serum Albumin in Temperature-Programmed "Shell-in-Shell" Structures", *Macromol. Rapid Commun.*, vol. 24, pp. 957-962 (2003).

Kanouni, M., et al., "Preparation of a stable double emulsion (W1/O/W2): role of the interfacial films on the stability of the system", *Adv Collid Interf Sci*, 99 (2002) 229-254.

Kim, H.K., et al., "Comparative study on sustained release of human growth hormone from semi-crystalline poly(L-lactic acid) and amorphous poly(D,L-lactic-co-glycolic acid) microspheres: morphological effect on protein release," *Journal of Controlled Release*, vol. 98, pp. 115-125 (2004).

Lamprecht, A., et al., "pH-sensitive microsphere delivery increases oral bioavailability of calcitonin," *Journal of Controlled Release*, vol. 98, pp. 1-9 (2004).

Leary, J.F., et al., "Application of Advanced Cytometric and Molecular Technologies to Minimal Residual Disease Monitoring," *Proceedings of SPIE*, vol. 3913, pp. 36-44 (2000).

Lee, D.H., et al., "Effective Formation of Silicone-in-Fluorocarbon-in-Water Double Emulsions: Studies on Droplet Morphology and Stability," *Journal of Dispersion Science and Technology*, vol. 23, No. 4, pp. 491-497 (2002).

Lee, M.H., et al., "Preparation of Silica Particles Encapsulating Retinol Using O/W/O Multiple Emulsions," *Journal of Colloid and Interface Science*, vol. 240, pp. 83-89 (2001).

Lemoff, A.V., et al., "An AC Magnetohydrodynamic Microfluidic Switch for Micro Total Analysis Systems", Biomedical Microdevices, 5(1):55-60, 2003.

Link, D.R., et al., "Geometrically Mediated Breakup of Drops in Microfluidic Devices," *Physical Review Letters*, vol. 92, No. 5 (2004).

Lopez-Herrera, J.M., et al., "Coaxial jets generated from electrified Taylor cones. Scaling laws.," *Aerosol Science*, vol. 34, pp. 535-552 (2003).

Lopez-Herrera, J.M., et al., "One-Dimensional Simulation of the Breakup of Capillary Jets of Conducting Liquids. Application to E.H.D. Spraying," *J. Aerosol. Sci.*, vol. 30, No. 7, pp. 895-912 (1999).

Lopez-Herrera, J.M., et al., "The electrospraying of viscous and non-viscous semi-insulating liquids. Scalilng laws.," *Bulletin of the American Physical Society*, vol. 40, No. 12, pp. 2041 (1995).

Lorenceau, E., et al., "Generation of Polymerosomes from Double-Emulsions," *Langmuir*, vol. 21, pp. 9183-9186 (2005).

Loscertales, I.G., et al., "Micro/Nano Encapsulation via Electrified Coaxial Liquid Jets," *Science*, vol. 295, pp. 1695-1698 (2002).

Lundstrom, Kenneth, et al., "Breakthrough in cancer therapy: Encapsulation of drugs and viruses", www.currentdruediscovery.com, Nov. 2002, 19-23.

Marques, F., et al., "Porous Flow within Concentric Cylinders," Bulletin of the American Physical Society Division of Fluid Dynamics, vol. 41, pp. 1768 (1996).

Nakano, M., et al., "Single-molecule PCR using water-in-oil emulsion," *Journal of Biotechnology*, vol. 102, pp. 117-124 (2003).

Molecular Probes, ATP Determination Kit (A-22066) (2003).

Nihant, N., et al., "Polylactide Microparticles Prepared by Double Emulsion/Evaporation Technique. 1. Effect of Primary Emulsion Stability," *Pharmaceutical Research*, vol. 11, No. 10, pp. 1479-1484 (1994).

Nof, M., et al., "Drug-releasing scaffolds fabricated from drug-loaded microspheres," *J. Biomed Mater Res*, vol. 59, pp. 349-356, pp. 349-356 (.

Oh, C., et al., "Distribution of Macropores in Silica Particles Prepared by Using Multiple Emulsions," *Journal of colloid and Interface Science*, vol. 254, pp. 79-86 (2002).

Okushima, S., et al,. "Controlled Production of Monodisperse Double Emulsions by Two-Step Droplet Breakup in Microfluidic Devices," *Langmuir*, vol. 20, pp. 9905-9908 (2004).

Ouellette, J., "A New Wave of Microfluidic Device," *The Industrial Physicist*, pp. 14-17, Aug./Sep. 2003.

Piemi, M.P.Y., et al., "Transdermal delivery of glucose through hairless rat skin in vitro: effect of multiple and simple emulsions," *International Journal of Pharamecutics*, vol. 171, pp. 207-215 (1998).

Raghuraman, B., et al., "Emulsion Liquid Membranes for Wastewater Treatment: Equillibrium Models for Some Typical Metal-Extractant Systems," *Environ. Sci. Technol.*, vol. 28, pp. 1090-1098 (1994).

Schubert, C., et al., "Designer Capsules," *Nature Medicine*, vol. 8, pp. 1362 (2002).

Silva-Cunha, A., et al., "W/O/W multiple emulsions of insulin containing a protease inhibitor and an absorption enhancer: biological activity after oral administration to normal and diabetic rats," *International Journal of Pharmaceutics*, vol. 169, pp. 33-44 (1998).

Sohn, L.L., et al., "Capacitance cytometry: Measuring biological cells one by one," *PNAS*, vol. 97, No. 20, pp. 10687-10690 (2000).

Song, H., et al., "A Microfluidic System for Controlling Reaction Networks in Time", *Angew Chem. Int Ed*, vol. 42(7), pp. 768-772 (2003).

Takeuchi, S., et al., "An Axisymmetric Flow-Focusing Microfluidic Device," *Adv. Mater.*, vol. 17, No. 8, pp. 1067-1072 (2005).

(56) References Cited

OTHER PUBLICATIONS

Tan, Y.C., "Microfluidic Liposome Generation from Monodisperse Droplet Emulsion—Towards the Realization of Artificial Cells", Summer Bioengineering Conference, 2003, Florida.
Tan, Y.C., "Monodisperse Droplet Emulsions in Co-Flow Microfluidic Channels", Micro TAS 2003, Lake Tahoe.
Tan, Y.C., et al., "Controlled Fission of Droplet Emulsions in Bifurcating Microfluidic Channels", Transducers 2003, Boston.
Tan, Y.C., et al., "Design of microfluidic channel geometries for the control of droplet volume, chemical concentration, and sorting", *Lab Chip*, 2004, 4:292-298.
Tawfik, D.S., et al., "Man-made cell-like compartments for molecular evolution," *Nature Biotechnology*, vol. 16, pp. 652-656 (1998).
Terray, A., et al, "Fabrication of linear colloidal structures for microfluidic applications," *Applied Physics Letters*, vol. 81, No. 9, pp. 1555-1557 (2002).
Terray, A., et al., "Microfluidic Control Using Colloidal Devices," *Science*, vol. 296, pp. 1841-1844 (2002).
Thorsen, T., et al., "Dynamic Pattern Formation in a Vesicle-Generating Microfluidic Device," *Physical Review Letters*, vol. 86, No. 18, pp. 4163-4166 (2001).
Umbanhowar, P.B., et al., "Monodisperse Emulsion Generation via Drop Break Off in a Coflowing Stream," *Langmuir*, vol. 16, pp. 347-351 (2000).
Utada, A.S., et al., "Monodisperse Double Emulsions Generated from a Microcapillary Device", Science, vol. 308, pp. 537-541 (2005).
Wolff, A., et al., "Integrating advanced functionality in a microfabricated high-throughput fluorescent-activated cell sorter," *Lab Chip*, vol. 3, pp. 22-27 (2003).
Xu, S., et al., "Generation of Monodisperse Particles by Using Microfluidics: Control over Size, Shape and Composition," *Angew. Chem. Int. Ed.*, vol. 43, pp. 2-5 (2004).
Yamaguchi, Y., et al., "Insulin-loaded biodegradable PLGA microcapsules: initial burst release controlled by hydrophilic additives,"*Journal of Controlled Release*, vol. 81, pp. 235-249 (2002).
Zhang, J.H., et al., "A Simple Statistical Parameter for Use in Evaluation and Validation of High Throughput Screening Assays," *Journal of Biomolecular Screening*, vol. 4, No. 2, pp. 67-73 (1999).
Zheng, B., et al., "A Microfluidic Approach for Screening Submicroliter Volumes against Multiple Reagents by Using Performed Arrays of Nanoliter Plugs in a Three-Phase Liquid/Liquid/Gas Flow," *Angew. Chem. Int. Ed.*, vol. 44, pp. 2520-2523 (2005).
International Search Report dated Dec. 20, 2004 in PCT/US2004/010903.
Written Opinion dated Dec. 17, 2004 in PCT/US2004/010903.
International Preliminary Report Oct. 14, 2005 in PCT/US2004/010903.
International Search Report dated Feb. 6, 2004 in PCT/US2003/20542.
International Preliminary Report dated Feb. 27, 2006 in PCT/US2004/027912.
Written Opinion dated Jan. 26, 2005 in PCT/US2004/027912.
International Search Report dated May 31, 2006 in PCT/US2006/001938.
Written Opinion dated May 31, 2006 in PCT/US2006/001938.
International Search Report dated Jun. 16, 2006 in PCT/US2006/007772.
Written Opinion dated Jun. 16, 2006 in PCT/US2006/007772.
Written Opinion from PCT Application PCT/US2007/002063 dated Jul. 29, 2008.
Office Action from U.S. Appl. No. 11/024,228 dated Dec. 14, 2007.
Office Action from U.S. Appl. No. 11/024,228 dated Jul. 9, 2008.
Office Action from U.S. Appl. No. 11/024,228 dated Dec. 11, 2008.
Office Action from U.S. Appl. No. 11/368,263 dated Dec. 19, 2008.
Priest, C. et al. "Generation of Monodisperse Gel Emulsions in a Microfluidic Device" Applied Physics Letters 88, 024106 (2006).

Sugiura, S., et al., "Interfacial Tension Driven Monodispersed Droplet Formation from Microfabricated Channel Array," *Langmuir*, vol. 17, pp. 5562-5566 (2001).
Zimmermann, U., et al., Microscale production of hybridomas by Hypo-Osmolar Electrofusion, Hum. Antibod. Hbridomas, 1992, vol. 3, Jan. 1992 Butterworth-Heinemann, pp. 14-18.
Web page, Experimental Soft Condensed Matter Group, "Cool Picture of the Moment" Harvard University, Prof. D. A. Weitz.
Office Action from U.S. Appl. No. 11/024,228 dated Jul. 13, 2009.
Office Action from U.S. Appl. No. 11/360,845 dated Apr. 2, 2009.
Office Action dated Jan. 20, 2010 for U.S. Appl. No. 11/360,845.
Office Action dated Jun. 7, 2010 for U.S. Appl. No. 11/698,298.
Office Action dated Aug. 4, 2010 for U.S. Appl. No. 12/726,223.
Office Action dated Aug. 4, 2010 for U.S. Appl. No. 11/360,845.
Chinese Office Communication mailed Oct. 10, 2011 for CN 201010599933.9.
Japanese Office Communication mailed Nov. 2, 2011 for JP 2004-549845.
Office Communication mailed Jan. 4, 2012 for U.S. Appl. No. 12/726,223.
Extended European Search Report for EP 08165420.4 mailed Nov. 3, 2009.
Extended European Search Report for EP 10181911.8 mailed Jun. 1, 2011.
Extended European Search Report for EP 10184514.7 mailed Dec. 20, 2010.
Invitation to Pay Additional Fees mailed Jun. 28, 2006 for PCT/US2006/007772.
International Search Report and Written Opinion mailed Sep. 1, 2006 in PCT/US06/007772.
International Preliminary Report on Patentability mailed Sep. 20, 2007 for PCT/US2006/007772.
International Search Report and Written Opinion mailed Jan. 28, 2005 for PCT/US2004/027912.
Japanese Office Action for JP 2006-509830 mailed Jun. 1, 2011.
Office Action for U.S. Appl. No. 11/360,845 mailed Apr. 26, 2011.
Advisory Action for U.S. Appl. No. 11/360,845 mailed Jun. 14, 2010.
Office Action for U.S. Appl. No. 11/698,298 mailed Feb. 15, 2011.
Advisory Action for U.S. Appl. No. 11/698,298 mailed May 20, 2011.
Office Action for U.S. Appl. No. 11/698,298 mailed Jun. 29, 2011.
Office Communication mailed Jan. 3, 2013 for U.S. Appl. No. 11/360,845.
Examination Report for EP 10181911.8 mailed May 7, 2012.
Japanese Office Action mailed Jun. 14, 2012 for JP 2006-509830.
Japanese Office Action mailed Jun. 4, 2012 for JP 2010-198393.
Chinese Office Communication mailed Aug. 8, 2012 for CN 201010599933.9.
Summons to attend oral proceedings dated Mar. 7, 2012 for EP 03762228.9.
Japanese Office Communication mailed Sep. 3, 2012 for JP 2009-265751.
Office Action mailed Jun. 28, 2012 for U.S. Appl. No. 11/360,845.
Extended European Search Report for EP 10175562 7 mailed Jan. 25, 2012.
Office Communication mailed Feb. 16, 2012 for U.S. Appl. No. 11/698,298.
Extended European Search Report for Application No. EP 13165665.4 mailed Nov. 22, 2013.
Extended European Search Report for Application No. EP 13165667.0 mailed Nov. 22, 2013.
Office Action for U.S. Appl. No. 13/679,190 dated Dec. 2, 2013.
Office Action for U.S. Appl. No. 11/360,845 dated Nov. 19, 2013.
Japanese Office Action for Application No. JP 2010-198393 mailed Jul. 31, 2013 for JP 2010-198393.
European Office Action dated Jun. 25, 2013 for EP 10184514.7.
Summons to attend oral proceedings dated Jun. 14, 2013 for EP 04782399.2.
Communication from Primary Examiner for Application No. EP 04782399.2.
Examiner's Report for Application No. CA 2640024 mailed May 23, 2013.

(56) References Cited

OTHER PUBLICATIONS

Japanese Office Action for Application No. JP 2008-552412 mailed Mar. 6, 2013.
Japanese Office Communication mailed Oct. 1, 2013 for Application No. JP 2009-265751.
European Decision to Refuse for Application No. EP 04782399.2 mailed Oct. 4, 2013.
European Office Action for Application No. 08165420.4 mailed Apr. 29, 2014.
Japanese Office Action for Application No. JP 2010-198393 mailed Nov. 18, 2013.
Japanese Office Action for Application No. JP 2009-231040 mailed Dec. 24, 2013.
Japanese Office Action for Application No. JP 2009-231040 mailed Jul. 1, 2014.
Office Action dated Jun. 5, 2014 for U.S. Appl. No. 13/679,190.
Advisory Action dated Sep. 9, 2014 for U.S. Appl. No. 13/679,190.
Advisory Action dated Oct. 16, 2014 for U.S. Appl. No. 13/679,190.
Chou et al. Disposable Microdevices for DNA Analysis and Cell Sorting. Proc. Solid-State Sensor and Actuator Workshop, Hilton Head, SC. Jun. 8-11, 1998; 11-14.
Ghadessy et al. Directed evolution of polymerase function by compartmentalized self-replication. Proc Natl Acad Sci USA. Apr. 10, 2001; 98(8):4552-7. Epub Mar. 27, 2001.
Hug et al. Measurement of the molecules of a single mRNA species in a complex mRNA preparation. J Theor Biol. Apr. 21, 2003; 221(4):615-24.
Japanese Office Action mailed Jan. 27, 2015 for Application No. 2014-028635 (H0498.70200JP02).

* cited by examiner

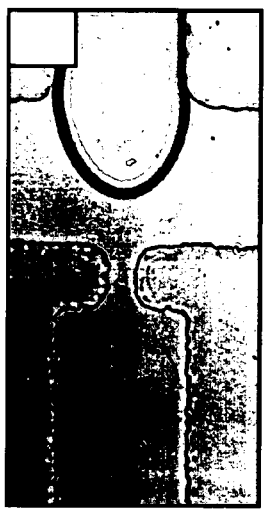  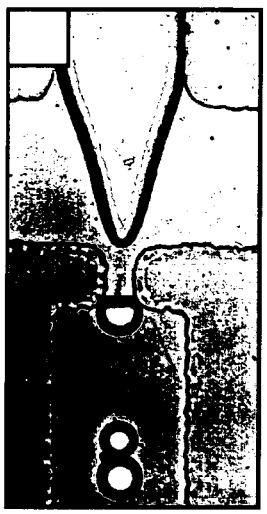 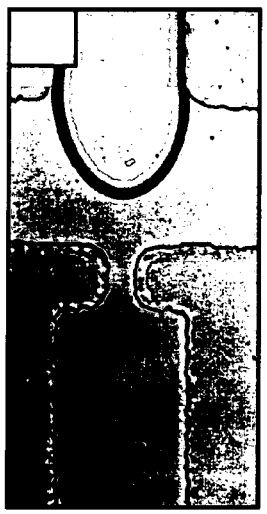
Fig. 11D   Fig. 11E   Fig. 11F   Fig. 11G
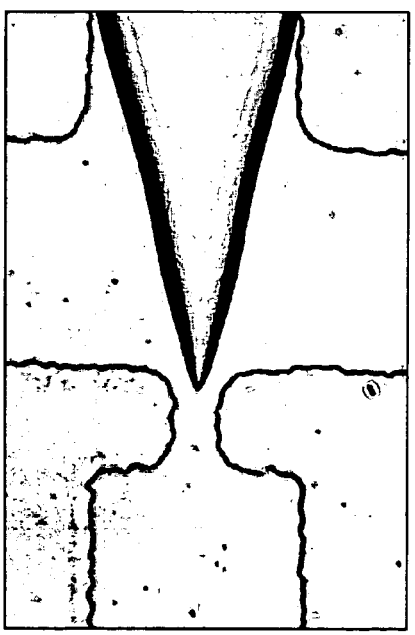 
Fig. 11H   Fig. 11I

FORMATION AND CONTROL OF FLUIDIC SPECIES

RELATED APPLICATIONS

This application is a continuation of PCT International Application No. PCT/US2004/010903, filed Apr. 9, 2004, entitled "Formation and Control of Fluidic Species" which claims the benefit of U.S. Provisional Patent Application Ser. No. 60/461,954, filed Apr. 10, 2003, entitled "Formation and Control of Fluidic Species," by Link, et al.

GOVERNMENT FUNDING

This invention was made with government support under grant number DMR-0243715 and DMR-0213805 awarded by the National Science Foundation and under grant number NAG3-2284 awarded by NASA. The government has certain rights in the invention.

FIELD OF INVENTION

The present invention generally relates to systems and methods for the formation and/or control of fluidic species, and articles produced by such systems and methods.

BACKGROUND

The manipulation of fluids to form fluid streams of desired configuration, discontinuous fluid streams, droplets, particles, dispersions, etc., for purposes of fluid delivery, product manufacture, analysis, and the like, is a relatively well-studied art. For example, highly monodisperse gas bubbles, less than 100 microns in diameter, have been produced using a technique referred to as capillary flow focusing. In this technique, gas is forced out of a capillary tube into a bath of liquid, where the tube is positioned above a small orifice, and the contraction flow of the external liquid through this orifice focuses the gas into a thin jet which subsequently breaks into equal-sized bubbles via a capillary instability. A similar arrangement can be used to produce liquid droplets in air.

Microfluidic systems have been described in a variety of contexts, typically in the context of miniaturized laboratory (e.g., clinical) analysis. Other uses have been described as well. For example, International Patent Application No. PCT/US01/17246, filed May 25, 2001, entitled "Patterning of Surfaces Utilizing Microfluidic Stamps Including Three-Dimensionally Arrayed Channel Networks," by Anderson, et al., published as Publication No. WO 01/89788 on Nov. 29, 2001, describes multi-level microfluidic systems that can be used to provide patterns of materials, such as biological materials and cells, on surfaces. Other publications describe microfluidic systems including valves, switches, and other components.

While significant advances have been made in dynamics at the macro- or microfluidic scale, improved techniques and the results of these techniques are still needed.

SUMMARY OF INVENTION

The present invention generally relates to systems and methods for the formation and/or control of fluidic species, and articles produced by such systems and methods. The subject matter of this application involves, in some cases, interrelated products, alternative solutions to a particular problem, and/or a plurality of different uses of a single system or article.

One aspect of the present invention includes a method. The method, in one set of embodiments, includes a step of surrounding a first fluid with a second fluid by action, at least in part, of an electric field. The method, according to another set of embodiments, includes a step of reducing a cross-sectional dimension of a fluidic stream exiting an outlet of a channel using an electric field. In one set of embodiments, the method includes a step of encapsulating a cell in a fluid droplet.

In one set of embodiments, the method includes a step of producing a fluidic stream, comprising a first fluid surrounded by a second, liquid fluid, by expelling the first fluid from an outlet of a channel. The fluidic stream, in some cases, has an average cross-sectional dimension perpendicular to its direction of travel that is smaller than an average cross-sectional dimension of the outlet of the channel. In another set of embodiments, the method is defined, at least in part, by a step of producing a fluidic stream of droplets. In some cases, the droplets can have an average diameter of less than about 60 microns and a distribution of diameters such that no more than about 5% of the droplets have a diameter greater than about 10% of the average diameter.

The method, in another set of embodiments, includes a step of producing a fluid Taylor cone within a liquid. The method, according to yet another set of embodiments, includes a step of producing a first fluid Taylor cone and a second fluid Taylor cone within the first fluid Taylor cone. In still another set of embodiments, the method includes steps of producing a fluid Taylor cone, and producing a tube of fluid from the fluid Taylor cone. In yet another set of embodiments, the method includes a step of producing a Taylor cone comprising a fluid having a viscosity of at least about 1.2 cp. In one set of embodiments, the method is defined, at least in part, by a step of producing a Taylor cone comprising air.

The method, in another set of embodiments, includes steps of charging a fluid droplet with an electric charge, and placing the fluid droplet in a solution comprising a species having an opposite electric charge. According to yet another set of embodiments, the method is defined, at least in part, by a step of producing an entity comprising a fluid in the presence of an electric field, where the fluid comprises substantially aligned molecules, where, in the absence of the electric field, the fluid does not comprise substantially aligned molecules.

In still another set of embodiments, the method includes steps of producing a first set of substantially parallel microtubes, producing a second set of substantially parallel microtubes, and contacting the first set of microtubes and the second set of microtubes.

In one set of embodiments, the method includes a step of producing, in a carrying liquid, a first droplet comprising a first liquid, where the first droplet has a maximum cross-sectional dimension of less than about 100 microns. The method also includes a step of producing a second droplet comprising a second liquid, where the second droplet has a maximum cross-sectional dimension of less than about 100 microns. In some cases, the method further includes a step of allowing the first droplet and the second droplet to coalesce into one combined droplet.

In another set of embodiments, the method includes a step of producing, in a microfluidic channel, a first droplet comprising a first liquid, where the first droplet is surrounded by a carrying liquid. The method may also include steps of producing a second droplet comprising a second liquid, and allowing the first droplet and the second droplet to coalesce into one combined droplet.

The method, according to yet another set of embodiments, may be defined, at least in part, by steps of imparting an electric charge to a first droplet comprising a first fluid and an opposite electric charge to a second droplet comprising a second fluid, and allowing the first and second droplets to coalesce into one combined droplet due to mutual charge attraction, under conditions in which the first and second droplets would not coalesce absent the respective electric charges imparted.

Another aspect of the present invention involves an apparatus. In one set of embodiments, the apparatus includes a channel, a reduction system constructed and arranged to reduce an average cross-sectional dimension of a fluidic stream exiting an outlet of the channel, and a second channel constructed and arranged to surround at least a portion of the fluidic stream with a second, liquid fluid. In another set of embodiments, the apparatus includes a channel having an outlet, and an electric field generator constructed and arranged to reduce a cross-sectional dimension of a fluid exiting the outlet of the channel.

In one set of embodiments, the apparatus includes a channel having an outlet through which a fluid can be expelled. In some cases, the channel is positioned to allow the fluid to be directed at a reduction system, where the reduction system is constructed and arranged to produce, from the fluid, a fluidic stream of droplets having an average diameter of less than about 60 microns and a distribution of diameters such that no more than about 5% of the droplets have a diameter greater than about 10% of the average diameter.

The apparatus, according to another set of embodiments, includes a first channel having an outlet for expelling a first fluid, a second channel having an outlet for expelling a second fluid, and an electric field generator positioned to generate an electric field proximate the predetermined location. In certain embodiments, the second channel is positioned to allow the second fluid to surround at least a portion of the first fluid at a predetermined location.

According to yet another set of embodiments, the apparatus comprises a channel having an outlet, an electric field generator positioned to induce an electric field in proximity of the outlet of the channel, and a dimensional restriction having a cross-sectional dimension smaller than an average cross-sectional dimension of the outlet of the channel. In some cases, the dimensional restriction is in fluidic communication with the channel.

In one set of embodiments, the apparatus includes a channel having an outlet, an electric field generator positioned to create a Taylor cone in a fluid exiting the outlet of the channel, and a stabilization system able to restrict motion of the Taylor cone. The apparatus, in another set of embodiments, includes a first channel having an outlet, a second channel having an outlet, and an electric field generator positioned to create a first Taylor cone in a first fluid exiting the outlet of the first channel and a second Taylor cone in a second fluid exiting the outlet of the second channel.

The invention, according to yet another aspect, is an article. In one set of embodiments, the article includes an emulsion of at least a fluid in a liquid. In some cases, the fluid consists essentially of droplets having an average diameter of less than about 1 micron and a distribution of diameters such that no more than about 5% of the droplets have a diameter greater than about 10% of the average diameter. The article, according to another set of embodiments, includes an emulsion comprising charged droplets in a liquid. The droplets may be essentially saturated in charge in some cases.

In one set of embodiments, the article includes an entity comprising at least a first fluid, where the first fluid comprises molecules substantially aligned in an electric field. The article, in another set of embodiments, includes a liquid comprising a droplet having a cross-sectional dimension of less than about 100 microns, where the droplet comprises a first fluid and a second fluid immiscible with the first fluid. According to yet another set of embodiments, the article is defined, at least in part, by an ordered array of microtubes.

In one aspect, the present invention is directed to a method of making one or more of the embodiments described herein. In another aspect, the present invention is directed to a method of using one or more of the embodiments described herein. In yet another aspect, the present invention is directed to a method of promoting one or more of the embodiments described herein.

Other advantages and novel features of the invention will become apparent from the following detailed description of various non-limiting embodiments of the invention when considered in conjunction with the accompanying figures. In cases where the present specification and a document incorporated by reference include conflicting disclosure, the present specification shall control.

BRIEF DESCRIPTION OF DRAWINGS

Non-limiting embodiments of the present invention will be described by way of example with reference to the accompanying figures, which are schematic and are not intended to be drawn to scale. In the figures, each identical or nearly identical component illustrated is typically represented by a single numeral. For the purposes of clarity, not every component is labeled in every figure, nor is every component of each embodiment of the invention shown where illustration is not necessary to allow those of ordinary skill in the art to understand the invention. In the figures:

FIGS. 11A-11I illustrate certain systems for reducing the cross-sectional dimension of a fluidic stream produced from a channel outlet, in various embodiments of the invention.

DETAILED DESCRIPTION

Definitions

The following definitions will aid in the understanding of the invention. As used herein, the term "fluid" generally refers to a substance that tends to flow and to conform to the outline of its container. Typically, fluids are materials that are unable to withstand a static shear stress. When a shear stress is applied to a fluid, it experiences a continuing and permanent distortion. Typical fluids include liquids (e.g., water or aqueous solutions) and gases (e.g., air, $O_2$, $N_2$, etc.), but may also include free flowing solid particles, viscoelastic fluids, and the like. The fluid may have any suitable viscosity, for example, a viscosity similar to water (e.g., as in an aqueous solution), oil, etc. In certain embodiments of the invention, the liquid may include an oil or an organic solvent, such as those known to ordinary skill in the art. If two or more fluids are present, each fluid may be independently selected among essentially any fluids (liquids, gases, and the like) by those of ordinary skill in the art, by considering the relationship between the fluids. The fluids may each be miscible or immiscible. For example, two fluids can be selected to be immiscible within the time frame of formation of a stream of fluids, or within the time frame of reaction or interaction. As an example, where the portions remain liquid for a significant period of time, the fluids may be immiscible. As another example, where, after contact and/or formation, the dispersed portions are quickly hardened by polymerization or the like, the fluids need not be as immiscible. Those of ordinary skill in the art can select suitable miscible or immiscible fluids, using contact angle measurements or the like, to carry out the techniques of the invention.

Figure 1F:
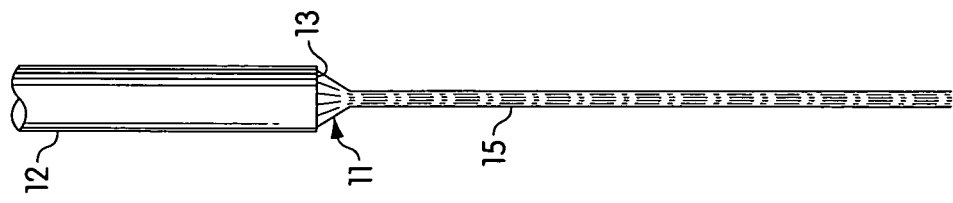
FIG. 1A-1F illustrate various fluidic streams flowing from channel outlets, some of which have a cross-sectional dimension smaller than a cross-sectional dimension of the channel outlet, in accordance with one embodiment of the invention.
Figure 1E:
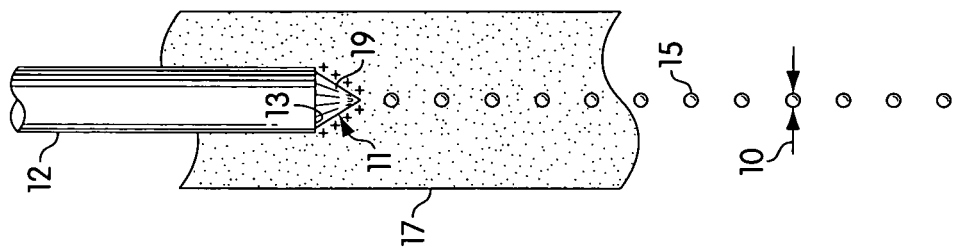

As used herein, the term "fluid stream" or "fluidic stream" refers to the flow of a fluid, typically generally in a specific direction. The fluidic stream may be continuous and/or discontinuous. A "continuous" fluidic stream is a fluidic stream that is produced as a single entity, e.g., if a continuous fluidic stream is produced from a channel, the fluidic stream, after production, appears to be contiguous with the channel outlet. An example of a continuous fluidic stream is illustrated in FIG. 1B. The continuous fluidic stream may be laminar, or turbulent in some cases. The continuous fluidic stream may be, e.g., solid or hollow (i.e., containing a second fluid internally, for example, as in a hollow tube). It is to be understood that wherever "tube" is used herein, the structure can be a hollow, a solid or filled (i.e., not hollow) stream, a stream that includes a central core and a surrounding layer or layers, any of which can be selectively reacted with any others, or solidified, or the like. In some cases, the central core is hollow, and/or fluid may be removed from a hardened surrounding fluid to produce a hollow tube.

Similarly, a "discontinuous" fluidic stream is a fluidic stream that is not produced as a single entity. A discontinuous fluidic stream may have the appearance of individual droplets, optionally surrounded by a second fluid. A "droplet," as used herein, is an isolated portion of a first fluid that completely surrounded by a second fluid. In some cases, the droplets may be spherical or substantially spherical; however, in other cases, the droplets may be non-spherical, for example, the droplets may have the appearance of "blobs" or other irregular shapes, for instance, depending on the external environment. An example of a discontinuous fluidic stream is illustrated in FIG. 1A. As used herein, a first entity is "surrounded" by a second entity if a closed loop can be drawn or idealized around the first entity through only the second entity. A first entity is "completely surrounded" if closed loops going through only the second entity can be drawn around the first entity regardless of direction.

In certain cases, a fluidic stream may be produced on the microscale, for example, in a microchannel. Thus, in some, but not all embodiments, at least some of the components of the systems and methods described herein using terms such as "microfluidic" or "microscale." As used herein, "microfluidic," "microscopic," "microscale," the "micro-" prefix (for example, as in "microchannel"), and the like generally refers to elements or articles having widths or diameters of less than about 1 mm, and less than about 100 microns (micrometers) in some cases. In some cases, the element or article includes a channel through which a fluid can flow. In all embodiments, specified widths can be a smallest width (i.e. a width as specified where, at that location, the article can have a larger width in a different dimension), or a largest width (i.e. where, at that location, the article has a width that is no wider than as specified, but can have a length that is greater). Additionally, "microfluidic," as used herein, refers to a device, apparatus or system that includes at least one microscale channel.

A "channel," as used herein, means a feature on or in an article (e.g., a substrate) that at least partially directs the flow of a fluid. In some cases, the channel may be formed, at least in part, by a single component, e.g. an etched substrate or molded unit. The channel can have any cross-sectional shape, for example, circular, oval, triangular, irregular, square or rectangular (having any aspect ratio), or the like, and can be covered or uncovered (i.e., open to the external environment surrounding the channel). In embodiments where the channel is completely covered, at least one portion of the channel can have a cross-section that is completely enclosed, and/or the entire channel may be completely enclosed along its entire length with the exception of its inlet and outlet.

A channel may have an aspect ratio (length to average cross-sectional dimension) of at least 2:1, more typically at least 3:1, 5:1, or 10:1. As used herein, a "cross-sectional dimension," in reference to a fluidic or microfluidic channel, is measured in a direction generally perpendicular to fluid flow within the channel. An open channel generally will include characteristics that facilitate control over fluid transport, e.g., structural characteristics (an elongated indentation) and/or physical or chemical characteristics (hydrophobicity vs. hydrophilicity) and/or other characteristics that can exert a force (e.g., a containing force) on a fluid. The fluid within the channel may partially or completely fill the channel. In some cases the fluid may be held or confined within the channel or a portion of the channel in some fashion, for example, using surface tension (e.g., such that the fluid is held within the channel within a meniscus, such as a concave or convex meniscus). In an article or substrate, some (or all) of the channels may be of a particular size or less, for example, having a largest dimension perpendicular to fluid flow of less than about 5 mm, less than about 2 mm, less than about 1 mm, less than about 500 microns, less than about 200 microns, less than about 100 microns, less than about 60 microns, less than about 50 microns, less than about 40 microns, less than about 30 microns, less than about 25 microns, less than about 10 microns, less than about 3 microns, less than about 1 micron, less than about 300 nm, less than about 100 nm, less than about 30 nm, or less than about 10 nm or less in some cases. In one embodiment, the channel is a capillary. Of course, in some cases, larger channels, tubes, etc. can be used to store fluids in bulk and/or deliver a fluid to the channel.

In some embodiments, the dimensions of the channel may be chosen such that fluid is able to freely flow through the channel, for example, if the fluid contains cells. The dimensions of the channel may also be chosen, for example, to allow a certain volumetric or linear flowrate of fluid in the channel. Of course, the number of channels and the shape of the channels can be varied by any method known to those of ordinary skill in the art. In some cases, more than one channel or capillary may be used. For example, two or more channels may be used, where they are positioned inside each other, positioned adjacent to each other, etc.

The indefinite articles "a" and "an," as used herein in the specification and in the claims, unless clearly indicated to the contrary, should be understood to mean "at least one."

As used herein, "or" should be understood to mean inclusively or, i.e., the inclusion of at least one, but including more than one, of a number or list of elements. Only terms clearly indicated to the contrary, such as "only one of" or "exactly one of," will refer to the inclusion of exactly one element of a number or list of elements.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements that the phrase "at least one" refers to, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

The following documents are incorporated herein by reference in their entirety: U.S. Provisional Patent Application Ser. No. 60/392,195, filed Jun. 28, 2002, entitled "Multiphase Microfluidic System and Method," by Stone, et al.; U.S. Provisional Patent Application Ser. No. 60/424,042, filed Nov. 5, 2002, entitled "Method and Apparatus for Fluid Dispersion," by Link, et al.; U.S. Provisional Patent Application Ser. No. 60/461,954, filed Apr. 10, 2003, entitled "Formation and Control of Fluidic Species," by Link, et al.; U.S. Provisional Patent Application Ser. No. 60/498,091, filed Aug. 27, 2003, entitled "Electronic Control of Fluidic Species," by Link, et al.; U.S. patent application Ser. No. 08/131,841, filed Oct. 4, 1993, entitled "Formation of Microstamped Patterns on Surfaces and Derivative Articles," by Kumar, et al., now U.S. Pat. No. 5,512,131, issued Apr. 30, 1996; International Patent Application No. PCT/US96/03073, filed Mar. 1, 1996, entitled "Microcontact Printing on Surfaces and Derivative Articles," by Whitesides, et al., published as WO 96/29629 on Jun. 26, 1996; U.S. patent application Ser. No. 09/004,583, filed Jan. 8, 1998, entitled "Method of Forming Articles Including Waveguides via Capillary Micromolding and Microtransfer Molding," by Kim, et al., now U.S. Pat. No. 6,355,198, issued Mar. 12, 2002; International Patent Application No. PCT/US01/17246, filed May 25, 2001, entitled "Patterning of Surfaces Utilizing Microfluidic Stamps Including Three-Dimensionally Arrayed Channel Networks," by Anderson, et al., published as Publication No. WO 01/89788 on Nov. 29, 2001; International Patent Application No. PCT/US01/46181, filed May 25, 2001, entitled "Methods and Compositions for Encapsulating Active Agents," by Weitz, et al., published as Publication No. WO 02/47665 on Jun. 20, 2002; International Patent Application No. PCT/US02/23462, filed Jul. 24, 2002, entitled "Laminar Mixing Apparatus and Methods," by Stroock, et al., published as WO 03/011443 on Feb. 13, 2003; and International Patent Application No. PCT/US03/20542, filed Jun. 30, 2003, entitled "Method and Apparatus for Fluid Dispersion," by Stone, et al., published as Publication No. WO 2004/002627 on Jan. 8, 2004.

EMBODIMENTS

The present invention generally relates to systems and methods for the formation and/or control of fluidic species, and articles produced by such systems and methods. The invention involves unique fluid channels, systems, controls, and/or restrictions, and combinations thereof, as further described below, as well as other features. In certain embodiments, the invention allows fluidic streams (which can be continuous or discontinuous, i.e., droplets) to be formed and/or combined, at a variety of scales, including microfluidic scales. In one set of embodiments, a fluidic stream is produced from a channel, where a cross-sectional dimension of the fluidic stream is smaller than that of the channel, for example, through the use of structural elements, other fluids, and/or applied external fields, etc. In some cases, a Taylor cone may be produced. In another set of embodiments, a fluidic stream may be manipulated in some fashion, for example, to create tubes (which may be hollow or solid), droplets, nested tubes or droplets, arrays of tubes or droplets, meshes of tubes, etc. In some cases, droplets produced using certain embodiments of the invention may be charged or substantially charged, which may allow their further manipulation, for instance, using applied external fields. Non-limiting examples of such manipulations include producing charged droplets, coalescing droplets (especially at the microscale), synchronizing droplet formation, aligning molecules within the droplet, etc. In some cases, the droplets and/or the fluidic streams may include colloids, cells, therapeutic agents, or the like.

Examples of methods of forming such articles and systems are further described below. Typically, when a fluidic stream is formed by producing or expelling fluid from a channel, the diameter or other cross-sectional dimension of the droplet is larger than the diameter or other cross-sectional dimension of the channel outlet. The fluidic stream may be, for instance, a continuous stream of fluid (e.g., a "tube") or a discontinuous stream of fluid (e.g., droplets); for example, as is shown in FIGS. 1A-1B, a fluid 15, produced from channel 12 through channel outlet 13, forms a discontinuous stream of fluid (FIG. 1A) or a continuous stream of fluid (FIG. 1B).

In one aspect, however, the present invention relates to the production or expulsion of a fluidic stream from a channel where the fluidic stream has a cross-sectional dimension that is smaller than a cross-sectional dimension of the channel outlet. In some cases, the present invention allows the production or expulsion of a fluidic stream from a channel to occur in a manner that provides unique control over the fluidic stream and/or unique combinations of fluid or materials, as further described herein. As an example, a fluidic stream may be manipulated using one or more structural elements in or near its path of flow. As another example, a fluidic stream being produced or expelled from the channel may be contacted with another fluid in some fashion to manipulate the fluidic stream. As yet another example, an externally applied field (e.g., an electric and/or a magnetic field) may be generated proximate the channel outlet and/or proximate a fluidic stream to manipulate the fluidic stream. Combinations of any of these and/or other systems and techniques, e.g. as further described herein, are also contemplated in the present invention. Furthermore, the size of the fluidic stream, including droplet sizes in discontinuous streams, can be very precisely controlled in some instances.

In some cases, the fluidic stream may have an average cross-sectional dimension smaller than about 90% of an average cross-sectional dimension of the channel, and in certain embodiments, smaller than about 80%, about 70%, about 60%, about 50%, about 40%, or about 30% of the average cross-sectional dimension of the channel. In other embodiments, the fluidic stream may have an average cross-sectional dimension smaller than about 20%, about 10%, about 5%, about 3%, about 1%, about 0.5%, about 0.3%, about 0.1%, about 0.05%, about 0.03%, or about 0.01% of the average cross-sectional dimension of the channel. The fluidic stream, in some embodiments, may be produced on the microscale, e.g., using a microfluidic channel. For instance, the fluidic stream may have an average cross-sectional dimension of less than about 1 mm, less than about 500 microns, less than about 300 microns, or less than about 100 microns. In some cases, the fluidic stream may have an average diameter of less than about 60 microns, less than about 50 microns, less than about 40 microns, less than about 30 microns, less than about 25 microns, less than about 10 microns, less than about 5 microns, less than about 3 microns, or less than about 1 micron.

In one set of embodiments, a structural element may be used to manipulate the fluidic stream in some fashion to produce a fluidic stream that has a cross-sectional dimension that is smaller than a cross-sectional dimension of a channel outlet that produces the fluid. In some cases, a fluidic stream may be produced where no cross-sectional dimension of the fluidic stream has a dimension that is larger than the smallest cross-sectional dimension of the channel outlet. A "structural element," as used herein, is a physical feature, in or proximate the channel, that is able to at least partially alter fluid flow from the channel. Examples of structural elements include dimensional restrictions, ridges, grooves, or the like. As used herein, a "dimensional restriction" is a structural element that is shaped to reduce a cross-sectional dimension of the fluidic stream. In some cases, the dimensional restriction is an annular orifice, but it can also take any of a varieties of forms, for example, elongate, ovoid, square, triangular, or the like. The dimensional restriction is non-valved in preferred embodiments. That is, the dimensional restriction is an orifice that cannot be switched between an open state and a closed state, and is typically of fixed size. As a non-limiting example, in FIG. 1C, a fluid 15 that is expelled from a channel 12 passes through a dimensional restriction 14 that causes the fluid to form a stream having a cross-sectional dimension 10 smaller than a cross-sectional dimension of the channel outlet 13. As another example, the fluid, after passing through the dimensional restriction, may become a discontinuous stream of fluid (not shown). Other non-limiting examples of dimensional restrictions may be seen in FIGS. 2B-2D. Still other examples of dimensional restrictions can be seen in International Patent Application No. PCT/US03/20542, filed Jun. 30, 2003, entitled "Method and Apparatus for Fluid Dispersion," by Stone, et al., incorporated herein by reference.

In some cases, the fluidic stream and/or the surrounding fluid has a mean cross-sectional dimension no smaller than 90% of the average cross-sectional dimension of the dimensional restriction, and in other embodiments, no smaller than 80%, 70%, 60%, 50%, 40%, or 30% of the average cross-sectional dimension of the dimensional restriction. This can be advantageous in certain cases in that a system of the invention can be operated over a range of fluid flowrates, and still produce a fluidic stream having the same, or approximately the same, size or cross-sectional dimension.

In another set of embodiments, one or more additional fluidic streams may be used to manipulate the fluidic stream in some fashion to produce a fluidic stream that has a cross-sectional dimension that is smaller than a cross-sectional dimension of a channel outlet that produces the fluid. The second fluid may be directed at the fluid and/or at the channel in such a way as to cause the fluidic stream produced by the channel to have a cross-sectional dimension smaller than a cross-sectional dimension of a channel outlet, and in some cases, such that no cross-sectional dimension of the fluidic stream has a dimension that is larger than the smallest cross-sectional dimension of the channel. In one embodiment, an additional fluid or fluids are directed in such a way as to surround or "sheath" the fluid being produced by the channel, reducing a cross-sectional dimension of the fluidic stream. The invention, in some cases, thus involves control over the average cross-sectional dimensions of the fluidic stream by control of the flowrate of a sheathing fluid, and/or control of the ratios of the flowrate of the fluidic stream relative to the sheathing fluid.

Figure 1D:
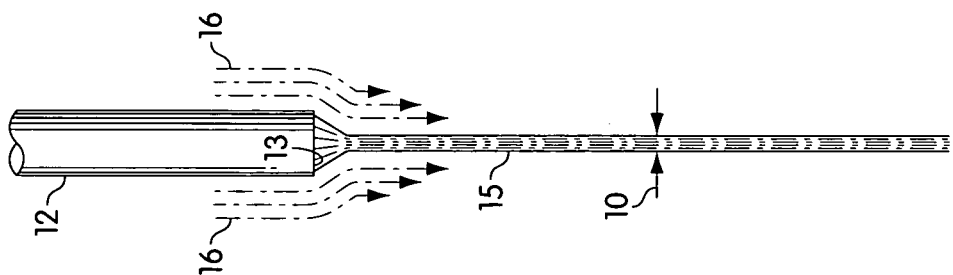
Figure 1C:
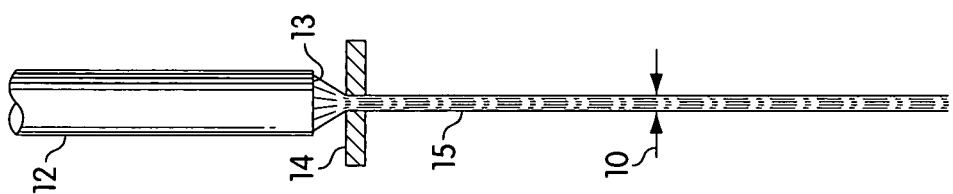
Figure 1B:
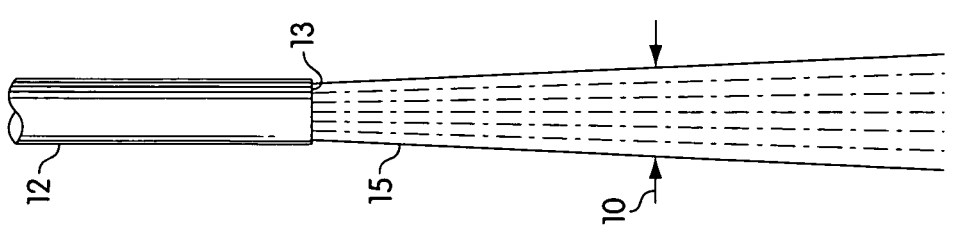
Figure 1A:
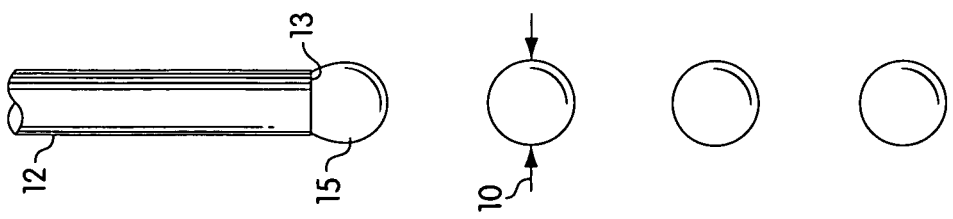

One non-limiting example is shown in FIG. 1D. In this figure, a fluid 15 that is expelled from a channel 12 is surrounded by a sheathing fluid 16 that flows around channel 12. The flow of fluid 16 around channel 12 may restrain the size of the fluidic stream 15, for example, producing a continuous (shown) or discontinuous fluidic stream. In another example (not shown), two or more sheathing fluidic streams may be provided, for example, on different sides of a fluidic stream, to reduce a cross-sectional dimension of the fluidic stream.

In yet another set of embodiments, an externally applied field (e.g., an electric and/or a magnetic field) may be generated proximate the channel outlet and/or proximate a fluidic stream to manipulate the fluidic stream, for example, to produce a fluidic stream that has a cross-sectional dimension that is smaller than a cross-sectional dimension of a channel outlet that produces the fluid. In one embodiment, the externally applied field includes a magnetic field. Techniques for producing suitable magnetic fields are known to those of ordinary skill in the art, for example, through the use of permanent magnets, electromagnets, or the like. In another embodiment, the externally applied field includes an electric field. The electric field may be generated from an electric field generator, i.e., a system able to produce an electric field, for example, directed substantially at the channel or at the channel outlet, and/or directed proximate the fluidic stream exiting the channel outlet. Techniques for producing a suitable electric field are known to those of ordinary skill in the art. For example, an electric field may be produced by applying a voltage drop across electrodes positioned proximate the channel outlet and/or fluidic stream. The electrodes can be fashioned from any suitable electrode material, for example, as silver, gold, copper, carbon, platinum, copper, tungsten, tin, cadmium, nickel, indium tin oxide ("ITO"), etc., as is known to those of ordinary skill in the art. In some cases, transparent or substantially transparent electrodes may be used.

A non-limiting example of the use of an externally applied field is shown in FIG. 1E. In this figure, a fluid 15 that is expelled from a channel 12 is substantially electrically conductive and a second fluid 17 surrounding channel 12 is substantially non-electrically conductive. As used herein, a material is "conductive" if it is able to conduct electricity, e.g., a conductor or a semiconductor. When an externally applied electric field is applied, a net electrical charge may build up on the surface 19 of the fluid at the channel outlet 13 due to the presence of an applied inductive electric field (illustrated in FIG. 1E as "+"). Due to charge repulsion, the shape of fluid 15 at the channel outlet 13 may be extended in some cases to form a substantially cone-like shape, known as a "Taylor cone" 11. A fluidic stream 15 (e.g., droplets or tubes) may be produced from the end of Taylor cone 11, which may allow excess charge to be removed from the Taylor cone 11.

Thus, an aspect of the present invention relates to the application of an electric field proximate a fluid exiting an outlet of a channel to form a Taylor cone, or other shape having reduced average cross-sectional dimension, relative to the average cross-sectional dimension of the outlet. In some cases, the fluid exiting the channel may be brought into contact with another fluid, which can be a liquid or a gas, and which may surround or at least partially surround the fluid exiting the channel. The fluid surrounding the fluidic stream may be air or other gas, or in some cases, a liquid. As an example, the fluid may completely surround the fluid exiting the channel in embodiments where a fluidic stream (e.g., droplets, a tube, etc.) is formed by the fluid exiting the channel. In other cases, however, there may be no fluid surrounding the fluidic stream, i.e., the Taylor cone may be formed in a vacuum.

A "Taylor cone," as used herein, is a shape that a fluidic stream of an at least partially electrically conductive fluid assumes when exposed to an externally applied inductive electric field, as is known to those of ordinary skill in the art. In the formation of a Taylor cone, an electric field may be applied to a fluidic stream exiting the outlet of a channel so as to pass through the fluid in the general direction of fluid flow. The fluid may assume a surface charge which is susceptible to the electric field, and the electric field thereby applies an attractive force to the fluid in the direction of fluid flow, thus forming an approximate cone shape with a cross-sectional dimension of the fluidic stream decreasing in the direction of fluid flow until it reaches a small cross-sectional dimension.

In embodiments where a fluidic stream is formed from a Taylor cone, the fluidic stream may be continuous (e.g., a "tube") or discontinuous (e.g., the fluidic stream may break up into droplets). In some cases, the continuity of the fluidic stream may be controlled by controlling the viscosity of the fluid forming the Taylor cone, and/or the surrounding fluid (if present). Higher viscosity fluids may more readily form continuous fluids from Taylor cones. For example, if a fluid within a channel is relatively viscous (e.g., greater than the viscosity of water), for instance, a fluid having a viscosity of at least about 1.2 cp, at least about 2 cp, at least about 5 cp, at least about 10 cp, at least about 50 cp, or at least about 100 cp, then a continuous stream or "tube" of fluid 65 may form from the end of the Taylor cone, e.g., as is shown in FIG. 1F, where a continuous fluidic stream 15 is produced from a Taylor cone 11. Non-limiting examples of such viscous fluids include an organic fluid, such as an oil or hydrocarbon.

As a specific example, in FIG. 1E, a Taylor cone may be created by applying an external electric field to a fluidic stream 15 exiting a channel 12 through channel outlet 13. As described above, electric charge may build on the surface 19 of the Taylor cone 11. Droplets 15 that form from the end of the Taylor cone due to fluid flow may be highly charged or even essentially saturated in charge in some cases (i.e., where additional charge cannot be added to the droplet without causing the droplet to dissociate into separate droplets). Once a charged droplet is formed, the charged droplet may repel other charged droplets due to electrical charge interaction. This interaction may cause the droplet to move from the Taylor cone at an accelerated speed, and/or cause the Taylor cone to substantially deform or move ("whipping behavior") through electric field interactions between the charged surface of the Taylor cone and the charged droplet. This interaction may be hard to predict and/or model in some instances.

Thus, in some cases, the present invention allows for very precisely controlled fluidic stream formation (e.g., droplets or a tube), for example, by controlling and/or limiting the movement of the Taylor cone and the production of a fluidic stream from the Taylor cone, and/or by controlling the characteristics of the fluid surrounding the Taylor cone (e.g., velocity, flowrate, viscosity, etc.). The present invention, in one embodiment, allows a fluidic stream to be produced that has a cross-sectional dimension smaller than a cross-sectional dimension of the channel outlet producing a Taylor cone. For example, the fluidic stream may have a cross-sectional dimension smaller than about 90% of an average cross-sectional dimension of the channel, and in certain embodiments, smaller than about 80%, about 70%, about 60%, about 50%, about 40%, about 30%, about 20%, about 10%, about 5%, about 3%, about 1%, about 0.5%, about 0.3%, about 0.1%, about 0.05%, about 0.03%, or about 0.01% of the average cross-sectional dimension of the channel, e.g., as previously described. In cases where the fluidic stream forms droplets, the droplets may have a homogenous distribution of diameters, i.e., the droplets may have a distribution of diameters in some cases, such that no more than about 10%, about 5%, about 3%, about 1%, about 0.03%, or about 0.01% of the droplets have an average diameter greater than about 10%, about 5%, about 3%, about 1%, about 0.03%, or about 0.01% of the average diameter of the droplets.

Thus, the present invention provides systems and methods for stabilizing a Taylor cone, according to one set of embodiments. For instance, a Taylor cone produced by a fluidic stream exiting channel in the presence of an electric field may be stabilized by reducing the cross-sectional dimension of the fluidic stream such that it is smaller than a cross-sectional dimension of the channel outlet, i.e., preventing or limiting the Taylor cone from substantially moving when a charged droplet is produced from the Taylor cone. As used herein, the Taylor cone is prevented from "substantially moving" if a charged droplet, formed after separation of the droplet from the Taylor cone, does not alter the cone angle of the Taylor cone by more than about 50%, and in some cases, such that the cone angle is not altered by more than about 40%, about 30%, about 20% or about 10%. Methods of reducing the cross-sectional dimension of the fluidic stream include those previously described, for example, using one or more additional fluidic streams (e.g., a sheathing fluid) and/or structural elements such as dimensional restriction.

For instance, in one embodiment, the invention includes one or more sheathing fluids able to limit the motion of the Taylor cone, for example, due to differences in viscosity between the Taylor cone fluid and the sheathing fluid, and/or due to the flowrate of the sheathing fluid. For example, a sheathing fluid may be highly viscous relative to the Taylor cone fluid, thus at least partially restraining movement of the Taylor cone during charged droplet formation. As another example, illustrated in FIG. 2A, a sheathing fluid may be moving at a high flowrate, relative to a Taylor cone fluid, such that the sheathing fluid is able to at least partially restrain movement of the Taylor cone during charged droplet formation.

Figure 2D:
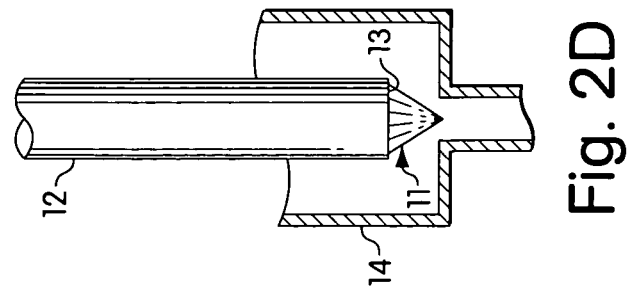
FIGS. 2A-2D illustrate certain systems for reducing the cross-sectional dimension of a fluidic stream produced from a channel outlet, in various embodiments of the invention.
Figure 2C:
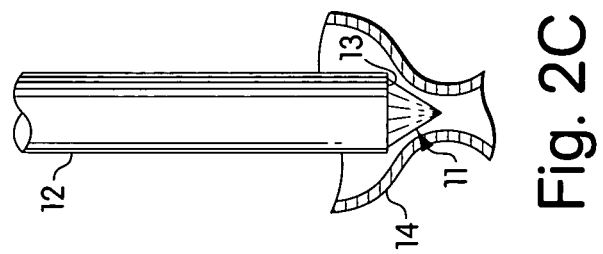
Figure 2B:
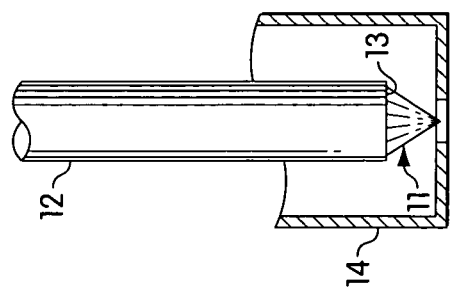
Figure 2A:
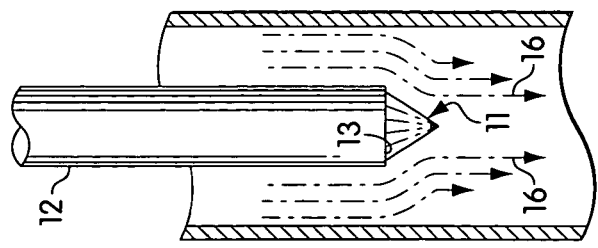

In another embodiment, the Taylor cone may be stabilized by urging at least a portion of the Taylor cone and/or a fluidic stream formed from the Taylor cone (which may be continuous or discontinuous) to flow through a dimensional restriction downstream of the outlet. For example, the channel outlet may feed fluid into an enclosed space, from which the fluid exits through a dimensional restriction. Non-limiting examples of such methods of stabilizing Taylor cones are illustrated in FIGS. 2B-2D, where Taylor cone 11 formed from channel 12 at channel outlet 13 is stabilized by dimensional restriction 14. Fluid flowrates may increase as the fluid passes through the dimensional restriction, which may constrain the movement of the Taylor cone within the dimensional restriction. Thus, sheathing fluid 16, as it passes through the dimensional restriction, may at least partially restraining movement of the Taylor cone. In FIGS. 2B-2D, the dimensional restriction is an annular orifice, but it can also take any of a variety of forms.

In yet another embodiment, the Taylor cone may be at least partially restraining from movement through a mechanical interaction, for example, through mechanical interaction of at least a portion of the Taylor cone with a side of a channel, a structural element such as a dimensional restriction, or the like.

Combinations of the above embodiments and/or other embodiments are also possible. For example, a Taylor cone may be at least partially stabilized by at least partially surrounding the Taylor cone fluid with a sheathing fluid and urging at least a portion of the Taylor cone to pass through a dimensional restriction. In some cases, the sheathing fluid may have an average cross-sectional dimension no smaller than about 90% of an average cross-sectional dimension of the dimensional restriction, and in certain embodiments, no smaller than about 80%, about 70%, about 60%, about 50%, about 40%, or about 30% of the average cross-sectional dimension of the dimensional restriction.

According to one set of embodiments, more than one Taylor cone may be produced using the systems and methods of the invention, for example, nested Taylor cones and/or parallel Taylor cones, etc. In some cases, each of the Taylor cones may independently be used to produce streams that are continuous (e.g., hollow or filled) or discontinuous (e.g., droplets), such as those previously described. In certain embodiments, the droplets may be highly charged or essentially saturated in charge.

Figure 3D:
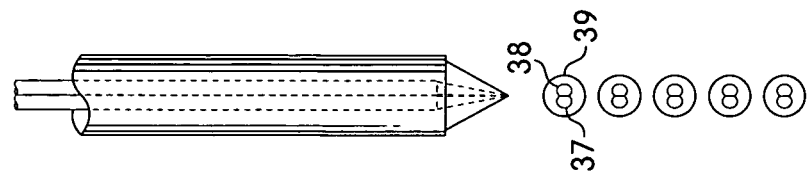
FIGS. 3A-3D illustrate various nested Taylor cones, according to certain embodiments of the invention.
Figure 3C:
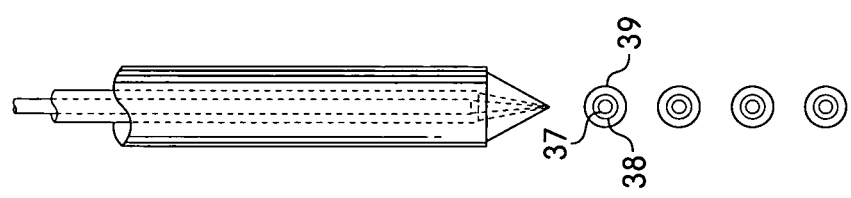
Figure 3B:
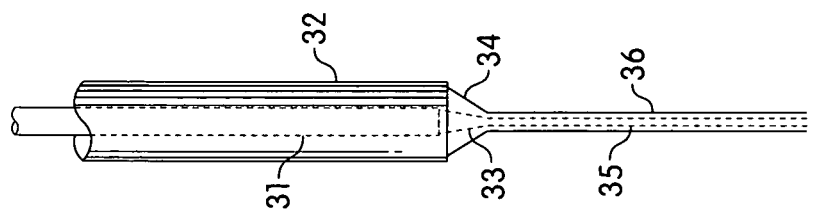
Figure 3A:
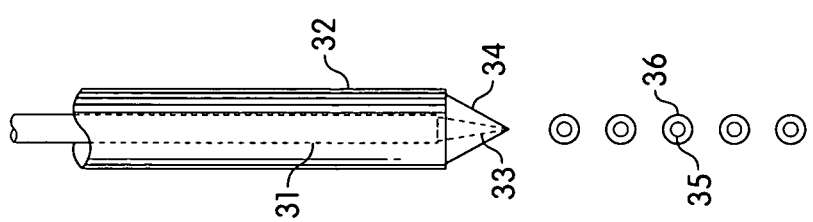

One embodiment of the invention allows for the production of nested Taylor cones, i.e., where one Taylor cone at least partially surrounds another Taylor cone. Non-limiting examples of nested Taylor cones are shown in FIGS. 3A-3D. Thus, in some cases, the invention may include at least a first channel for carrying a first fluid and a second channel for carrying a second fluid, where the channels are positioned such that one Taylor cone at least partially surrounds another Taylor cone. In certain instances, the channels are positioned such that one fluid encapsulates a second fluid. The fluids may each be miscible, or immiscible in some cases, depending on the application. As examples, in FIGS. 3A and 3B, two Taylor cones 33, 34 are produced in two channels 31, 32, respectively, that are nested (i.e., where channel 31 is nested in channel 32). The resulting fluidic stream of droplets (FIG. 3A) or a tube (FIG. 3B) include one fluid 35 nested inside a second fluid 36 (produced from respective channels 31 and 32). FIGS. 3C and 3D illustrate similar, non-limiting examples having three Taylor cones and three fluids 37, 38, and 39. Depending on the configuration of the channels, a nesting of three fluids may be produced (FIG. 3C), a nesting of two fluids inside a third fluid may be produced (FIG. 3D), etc. Those of ordinary skill in the art will be ascertain other embodiments and equivalents; for example, a nesting of four, five, or more Taylor cones may be used in some cases.

As examples, if one fluid is a gas and one is a liquid, an aerosol may be produced. As another example, if one fluid is a gas and one fluid is an oil, a foam or a foam-like structure may be produced (for example, if the internal contents of the droplet are allowed to mix). As yet another example, a hollow capsule or a hollow tube may be produced, for example, if a liquid is used to encapsulate a gas. In some instances, two miscible liquids may be mixed if the two fluids are both miscible liquids. As another example, two reactive components may be mixed or encapsulated, where a reaction (for example, a solidification reaction) occurs at the interface of the two components. Thus, for instance, a droplet or a tube having a solid shell surrounding a liquid center may be fabricated using the invention. In another example, one fluid of a droplet which may be reactive to the environment that the droplet is in may be encapsulated by a fluid not substantially reactive to the environment; thus, a protective "shell" around the fluid may be formed by the other fluid.

Figure 4A:
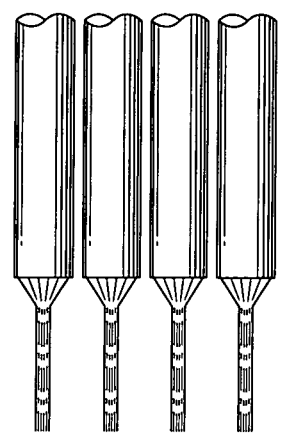
FIGS. 4A-4C illustrate various fluidic stream arrays, according to some embodiments of the invention.
Figure 4B:
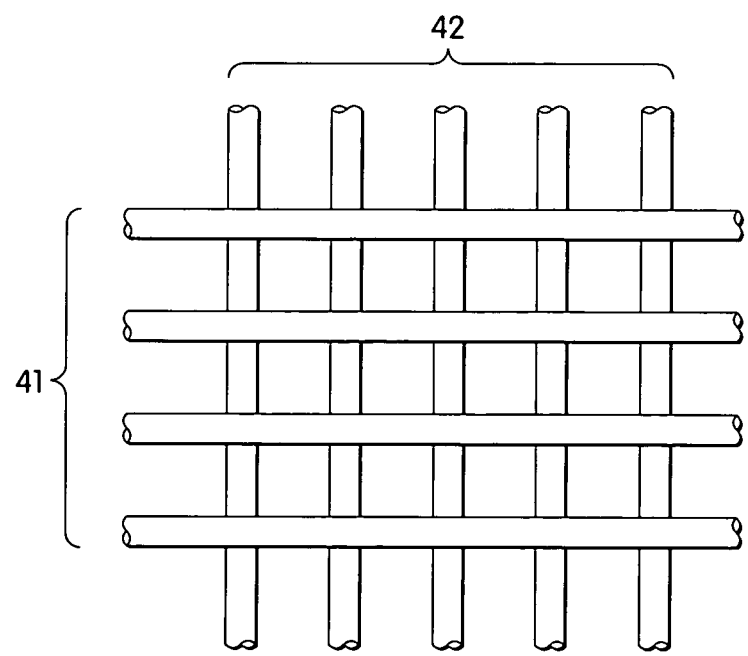
Figure 4C:
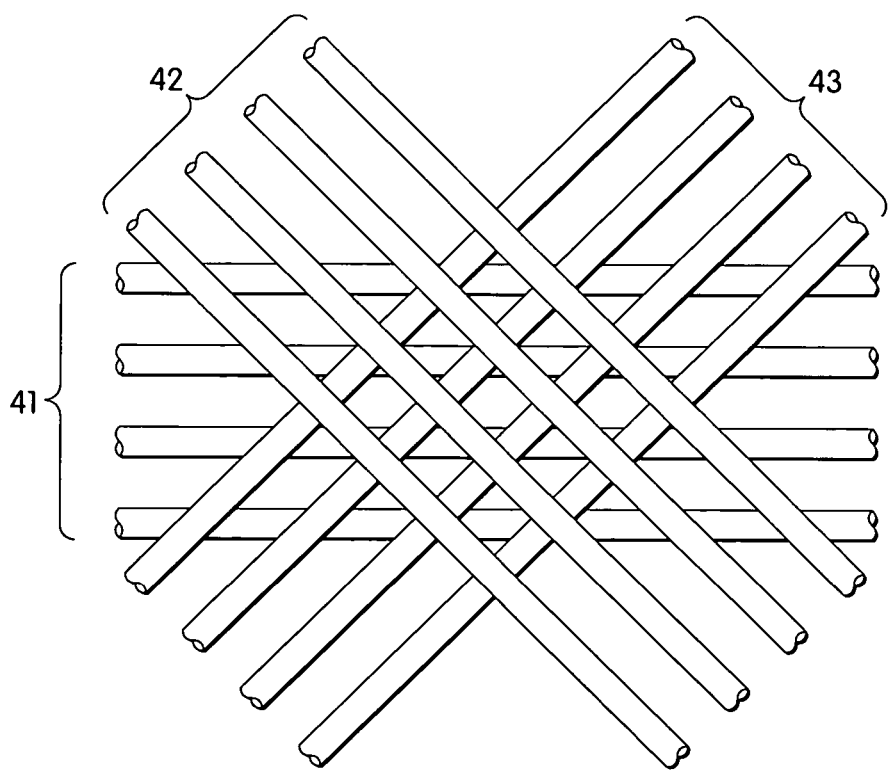

Another embodiment of the invention allows for the production of a series of two, three, or more parallel Taylor cones (e.g., FIG. 4A), which may allow the production of a series of two, three, or more parallel continuous fluidic streams in some cases. In cases where at least one of the fluidic streams is hardenable into a solid (e.g., as further described below), the invention also relates to a mesh of tubes. For example, a series of channels may be used to produce a series of tubes, as is shown in FIG. 4A. The tubes may be solid or hollow. The channels may have any orientation with respect to each other, e.g., parallel, perpendicular, at an angle, etc. In some cases, the series of tubes may be bonded with other tubes to create a mesh or a network of tubes, e.g., as is shown in FIG. 4B (illustrating two series of parallel tubes 41, 42) and FIG. 4C (illustrating three series of parallel tubes 41, 42, 43). Each series of tubes can be positioned in any orientation with respect to other tubes, and with any desired spacing. In some cases, the network of tubes may have controlled pore size distributions, where the pores are defined by the spaces between the tubes. For instance, a mesh of nanotubes can be created that has a very narrow pore size distribution, e.g., such that less than about 5%, less than about 3%, less than about 1%, less than about 0.05%, less than about 0.03%, less than about 0.01%, less than about 0.005%, less than about 0.003%, or less than about 0.001% or less of the pores has a diameter greater than the average diameter of all the pores.

Another aspect of the present invention relates to the hardening of a fluidic stream into a solid. The fluidic stream may be produced, for example, from a Taylor cone, from a channel outlet having a cross-sectional dimension greater than that of the fluidic stream, and/or any system or method described herein for producing fluidic streams. The fluidic stream may be continuous (e.g., tubes, which may be hollow or filled) or discontinuous stream (e.g., droplets), as described above. As used herein, the "hardening" of a fluidic stream refers to a process by which at least a portion of the fluidic stream is converted into a solid or at least a semi-solid state (e.g., a gel, a viscoelastic solid, etc.).

In one set of embodiments, the fluidic stream may be hardened through drying techniques, i.e., a portion of the fluidic stream is dried to produce a solid. Non-limiting examples of drying techniques include spray drying, exposure to increased temperatures, or the like. In another set of embodiments, the fluidic stream may be hardened through a chemical reaction, i.e., a fluid component of the fluidic stream is reacted in some fashion (for example, with another component of the fluidic stream, with a reactant in the fluid surrounding the fluidic stream, with light, etc.) to form a solid.

In one set of embodiments, the entire fluidic stream may be solidified; however, in other embodiments, only a portion of the fluidic stream may be solidified, thus, for example, resulting in a material having a fluid core surrounded by a solidified shell. In one example arrangement, a first fluidic stream is formed, surrounded by a second fluidic stream, and the second fluidic stream is selectively hardened, forming a solidified tube or shell surrounding the first fluidic stream. As another example, a continuous fluidic stream can be hardened into small fibers via a temperature change, a chemical reaction, a photochemical reaction, etc. As yet another example, droplets formed in this way can be similarly treated, and/or carried to other droplets for combination and potential chemical reaction to form beads, colloids, quantum dots, or essentially any other solid article or gel obtainable from liquid droplets.

In some cases, one or more tubes produced by solidifying a continuous fluidic stream may be used as a fiber or a fiber-optic cable. In another example, multiple solidified fluidic streams may be used in a fabric, a mesh, or a membrane. Such materials may, in some cases, have controlled pore size distributions, for example, as previously described.

In yet another aspect, the present invention generally relates to the manipulation of fluidic streams, for example, continuous (e.g., tubes) or discontinuous streams of fluid (e.g., droplets) produced by any of the techniques described herein, for example, through the use of Taylor cones as previously described. In some cases, the fluidic stream being manipulated may be highly charged or essentially saturated in charge in some cases. For example, the process used to create the droplets (for example, through use of a Taylor cone) may also cause an electrical charge to be induced onto the droplets. In certain instances where the fluidic stream includes droplets, the droplets being manipulated may have a homogenous distribution of diameters, i.e., the droplets may have a distribution of diameters such that no more than about 10%, about 5%, about 3%, about 1%, about 0.03%, or about 0.01% of the droplets have an average diameter greater than about 10%, about 5%, about 3%, about 1%, about 0.03%, or about 0.01% of the average diameter of the droplets.

In one set of embodiments, systems and methods are provided that are able to cause two or more droplets (e.g., arising from discontinuous streams of fluid) to fuse or coalesce into one droplet, for example, in cases where the two or more droplets ordinarily are unable to fuse or coalesce, for example due to composition, surface tension, droplet size, etc. It should be noted that, in some cases, the below descriptions with respect to droplets can also be applied to tubes and other continuous fluidic streams, for example, by applying a positive charge to a first tube and a negative charge to a second tube, in the creation of tubes containing partially separated fluids, etc.

As an example, in microfluidic systems, the surface tension of the droplets, relative to the size of the droplets may prevent fusion or coalescence of the droplets from occurring. In one embodiment, two droplets may be given opposite electrical charges (i.e., positive and negative charges, not necessarily of the same magnitude), which may increase the electrical interaction of the two droplets such that fusion or coalescence of the droplets can occur. Electrical charges (positive or negative) may be imparted onto droplets through the use of Taylor cones as previously described, or through any other suitable techniques known to those of ordinary skill in the art. For instance, an electric field may be imposed on a reactor containing the droplets, the droplets may be passed through a capacitor, a chemical reaction may occur to cause the droplets to become charged, etc.

Figure 5A:
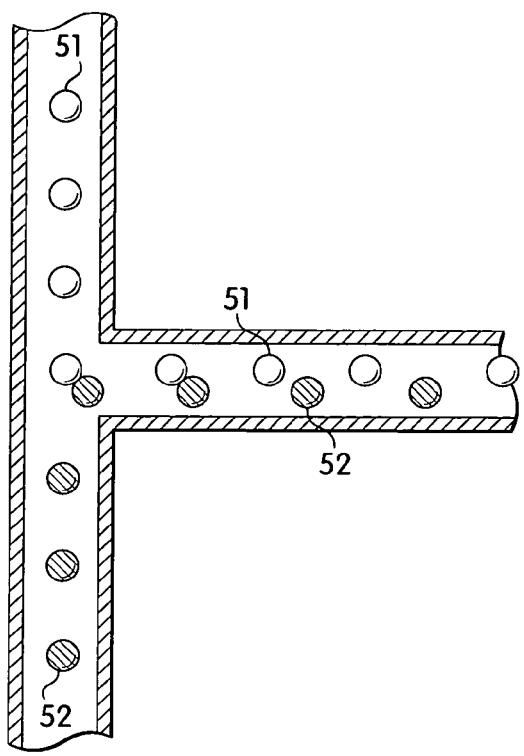
FIGS. 5A-5G illustrate uncharged and charged droplets in channels, according to certain embodiments of the invention.
Figure 5B:
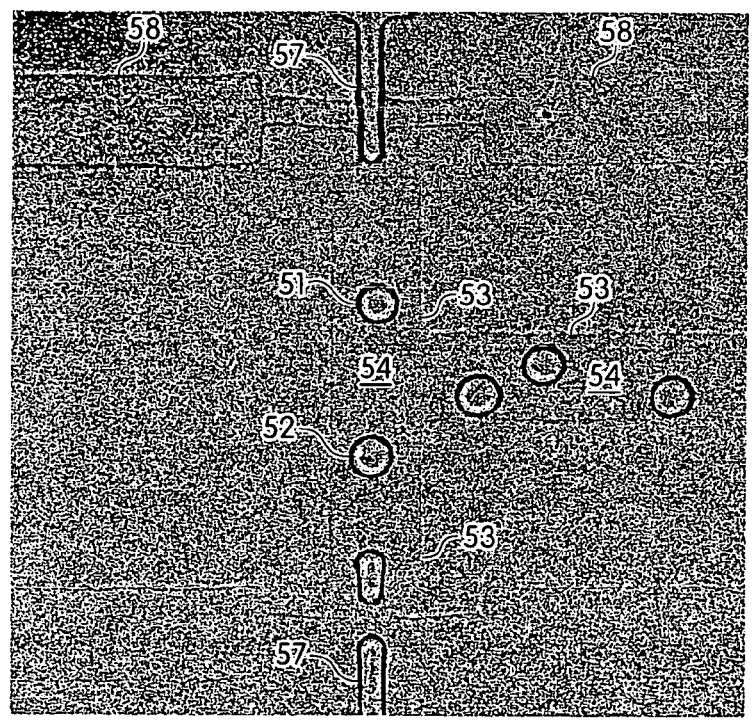

For example, as is shown schematically in FIG. 5A, uncharged droplets 51 and 52 brought into contact with each other are not able to fuse or coalesce, for instance, due to their size and/or surface tension. The droplets, in some cases, may not be able to fuse even if a surfactant is applied to lower the surface tension of the droplets, for example, due to their size if the droplets are microfluidic droplets. An example photomicrograph of such a microfluidic system is shown in FIG. 5B, where droplets 51 and 52 each are water droplets contained within a microfluidic channel 53, where the droplets arise from water source 57 and are carried by a carrier fluid (oil) 54 arising from channels 58.

Figure 5C:
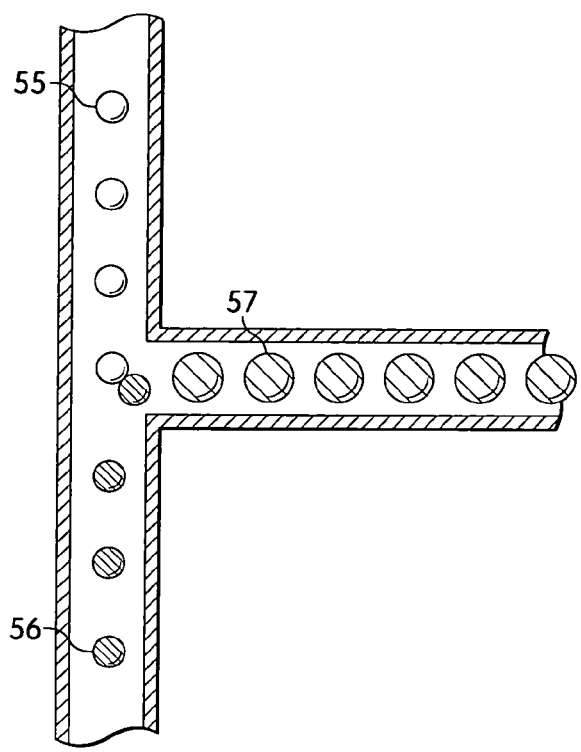
Figure 5D:
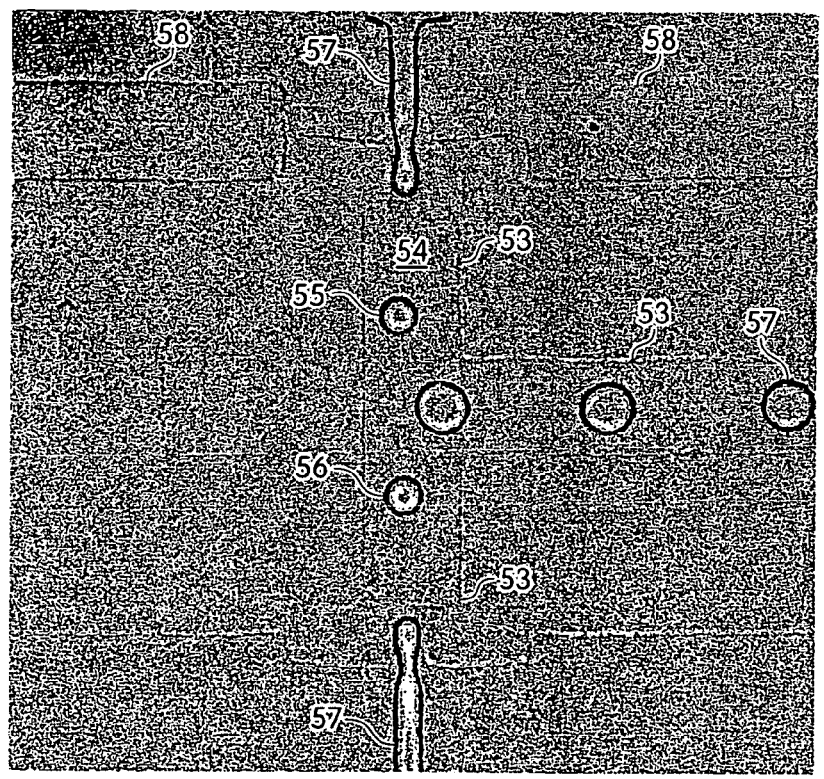
Figure 5E:
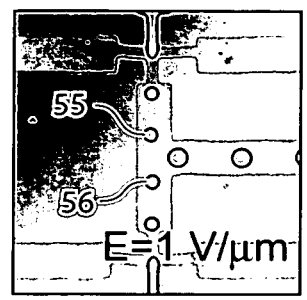
Figure 5F:
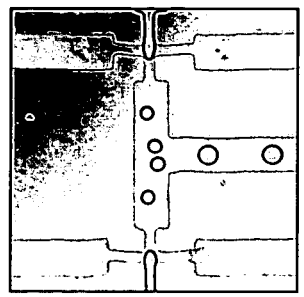
Figure 5G:
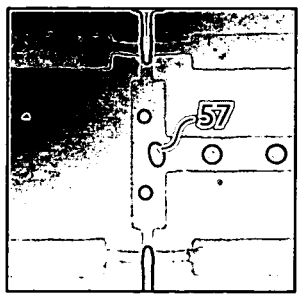

However, if the droplets are electrically charged with opposite charges (which can be, but are not necessarily of, the same magnitude), the droplets may become able to fuse or coalesce. For instance, in FIG. 5C, positively charged droplets 55 and negatively charged droplets 56 are directed at each other such that the electrical interaction of the oppositely charged droplets causes the droplets to fuse or coalesce into fused droplets 57. An example photomicrograph in microfluidic system is shown in FIG. 5D, where droplets 55 and 56 each are water droplets, contained within a carrier fluid (oil) 54 within a microfluidic channel 53. A series of a time sequence of photomicrographs of such a system is shown in FIGS. 5E-5G, where droplets 55 and 56 fuse to form droplets 57.

Figure 6A:
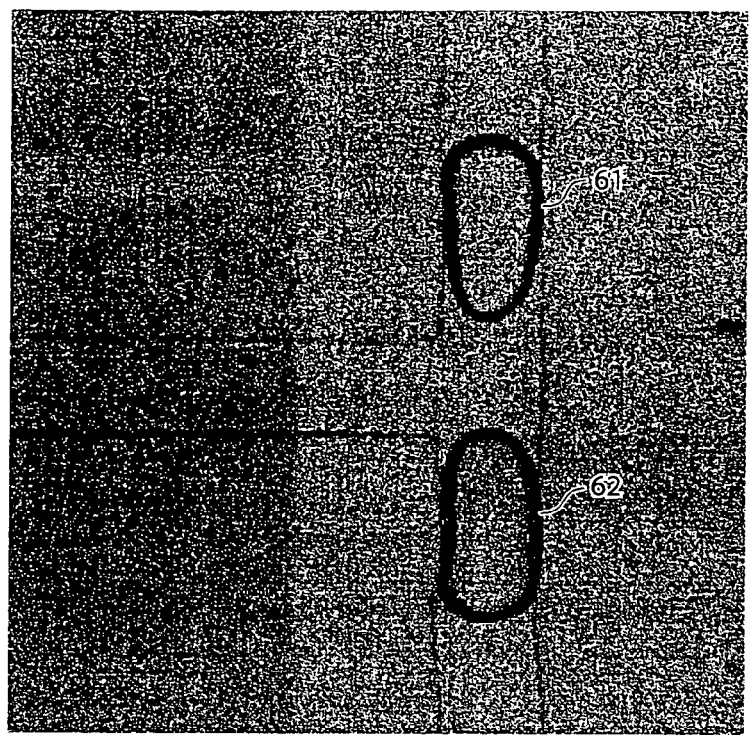
FIGS. 6A-6D illustrate bridge formation, in accordance with another embodiment of the invention.
Figure 6B:
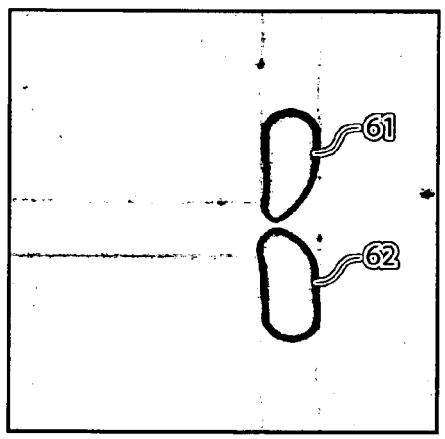
Figure 6C:
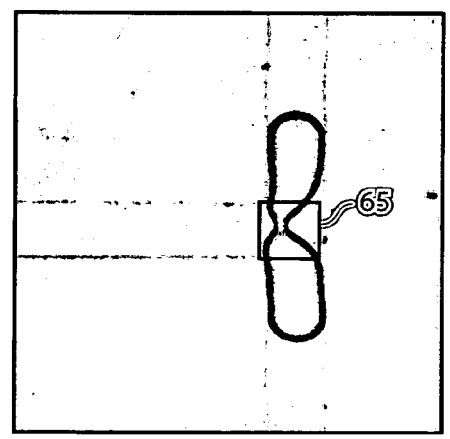
Figure 6D:
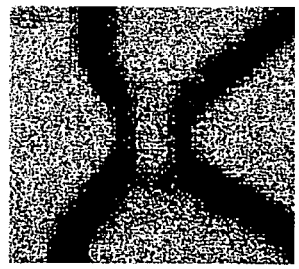

In some cases, the droplets may fuse through the creation of a "bridge" of fluid between the droplets, as is shown sequentially in FIGS. 6A-6C, which may occur due to the opposite charge interaction between fluids 61 and 62. An expanded view of the fluidic bridge 65 is shown in FIG. 6D, showing that the surfaces of the fluidic droplets have been merged. The creation of the "bridge" of fluid between the droplets may allow the droplets to exchange material and/or coalesce or fuse into one droplet.

It should be noted that when two or more droplets "coalesce," perfect mixing of the fluids from each droplet in the resulting droplet does not instantaneously occur. In some cases, the fluids may not mix, react, or otherwise interact, thus resulting in a fluid droplet where each fluid remains separate or at least partially separate. In other cases, the fluids may each be allowed to mix, react, or otherwise interact with each other, thus resulting in a mixed or a partially mixed fluid droplet. In some cases, the coalesced droplets may be contained within a carrying fluid, for example, an oil in the case of aqueous droplets.

Figure 7A:
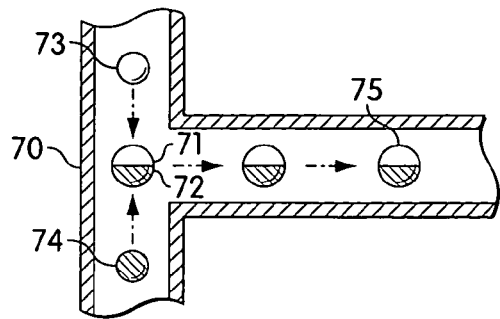
FIGS. 7A-7D illustrate droplets having two or more fluid regions, according to one embodiment of the invention.
Figure 7B:
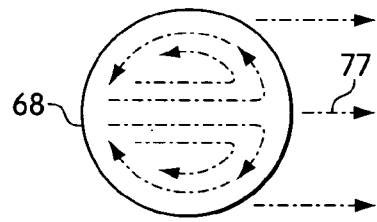

In one set of embodiments, a coalesced droplet (or other fluidic stream) may contain two or more regions of fluid, where the fluids remain separate or at least partially separate. For example, as is shown in FIG. 7A, in channels 70, a coalesced droplet may initially be formed of a first region of fluid 71 (from droplet 73) and a second region of fluid 72 (from droplet 74). The fluid regions may remain as separate regions, thus resulting in a non-uniform fluid droplet 75. In some cases, the fluid regions within the droplet may remain separate (without additional mixing factors) due to the flow of fluid within the droplet. For instance, the droplet may thus exhibit internal "counter-revolutionary" flow, e.g., as is illustrated in FIG. 7B, where fluid droplet 68 moves in direction 77. Counter-revolutionary flow within a droplet may prevent the fluids within the droplet from substantially mixing in some cases.

As one particular example, a coalesced droplet containing a first region of fluid containing a first dye (i.e., a molecule or molecules that can be optically determined to contain a color) and a second region of fluid containing a second dye (or no dye) may be created such that the first region and the second region are visually different. For instance, the first region may be white (or transparent) and the second region may be black; the first region may be cyan, magenta, and/or yellow and the second region may be black or white (or transparent); the first region may be red, green, and/or blue and the second region may be black or white (or transparent), etc. Such coalesced droplet could be used, for example, in a system where an electric field or other external field may be applied to the droplets to alter their visual appearance. In some cases, the coalesced droplets may be hardened into particles, e.g. as previously described.

Figure 7C:
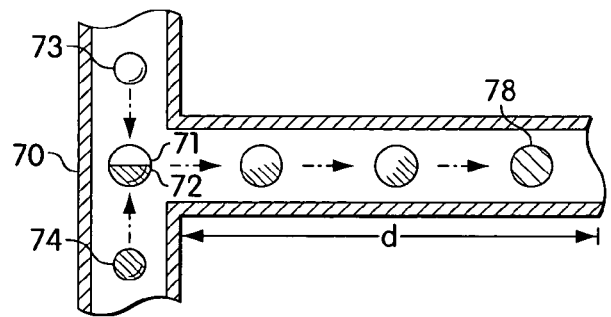

However, in another set of embodiments, two or more regions of fluid in a coalesced droplet (or other fluidic stream) may be allowed to partially or completely mix, react, or otherwise interact with each other. For example, as is shown in FIG. 7C, in channels 70, a coalesced droplet may initially be formed of a first region of fluid 71 (from droplet 73) and a second region of fluid 72 (from droplet 74). The fluid regions can then mix, react, or otherwise interact, eventually forming a coalesced droplet 78 that is partially or completely (i.e., homogeneously) mixed. Mixing of the regions of fluid within the coalesced droplet may be allowed to occur through any suitable mechanism, for example unassisted or natural methods, such as through diffusion (e.g., through the interface between the two regions of fluid), through reaction of the fluids with each other, and/or through fluid flow within the droplet (i.e., convection). In some embodiments, only a portion or a component of a region of fluid (for example, a reactant, as further described below), interacts with other regions of fluid (or a portion or a component thereof), e.g., through mixing, reaction, etc.

Figure 7D:
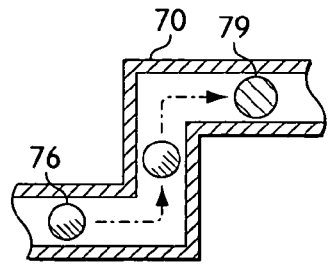

In other embodiments, however, mixing of the regions of fluid within the coalesced droplet may be enhanced in some fashion. As one example, the coalesced droplet may be passed through one or more channel regions which cause the droplet to change direction. The change of direction may alter convection patterns within the droplet, allowing the two fluids to be mixed, resulting in an at least partially mixed droplet. As an example, in FIG. 7D, droplet 76 may be passed through one or more bends within channel 70, causing the contents of droplet 76 to be at least partially mixed, resulting in droplet 79. Each of the bends may independently be a perpendicular bend (e.g., as is illustrated in FIG. 7D), and/or a bend having any suitable angle, for example, a bend having an angle of about 15°, about 30°, about 45°, about 60°, about 75°, about 90°, about 105°, about 120°, about 135°, about 150°, about 165°, etc. As another example, a droplet may pass by one or more features within or proximate a channel (e.g., ridges, posts, protrusions, beams, indentations, dips, etc.) which are able to cause the contents of the droplet to be at least partially mixed. Non-limiting examples of such features are disclosed in International Patent Application No. PCT/US02/23462, filed Jul. 24, 2002, entitled "Laminar Mixing Apparatus and Methods," by Stroock, et al., published as WO 03/011443 on Feb. 13, 2003, incorporated herein by reference.

In one set of embodiments, the droplets (or other fluidic stream) being fused or coalesced may contain reactants (e.g., chemicals, biological molecules, biological entities such as cells, viruses, bacteria, etc.) able to react or otherwise interact with each other. The reactant may be the fluid comprising the droplet and/or a fluidic region within the droplet, and/or the reactant may be carried (e.g., dissolved, suspended, etc.) by a fluid within the droplet and/or within a fluidic region of the droplet. The reaction may be, for example, a precipitation reaction, i.e., the reactants may react in some fashion to produce a solid particle, such as a quantum dot. The reactants may also include, as further non-limiting examples, reactive chemicals, proteins, enzymes/substrates, nucleic acids, proteins/nucleic acids, enzymes/nucleic acids, acids/bases, antibodies/antigens, ligands/receptors, chemicals/catalysts, etc, as well as combinations of these and other reactants. As another example, one or both droplets may be or contain one or more cells; for instance, if both droplets are (or contain) cells, the two cells may be fused together, for instance, to create a hybridoma cell. As yet another example, one droplet that is or contains a cell may be fused with another droplet to create a cell encapsulated in a fluid. Additionally, the fluid may be solidified in some cases to create a cell encapsulated in a solid. As still another example, one droplet may be (or contain) a cell and the other droplet may contain an agent to be delivered to the cell, such as a chemical, a biological molecule, a biological entity, etc., for instance, by fusing a droplet containing the agent with the cell. Non-limiting examples include a nucleic acid (e.g., DNA or RNA, for example, for gene therapy), a protein, a hormone, a virus, a vitamin, an antioxidant, etc.

One embodiment of the present invention provides systems and methods for determining such reactions. As an example, a reaction may be determined by measuring the distance and/or the time between where the reactants are brought into contact and the time the reaction has reached a certain point. For example, with reference to FIG. 7C, two droplets 73, 74 may each contain reactants for a particular reaction. The two droplets are coalesced together into a coalesced droplet containing fluidic regions 71 and 72; thus, the reaction is initiated at a certain time and/or at a certain point within channel 70. As the droplet moves through channel 70, the reactants may react. At a particular point d in the channel, the reaction may be determined to have been completed, e.g., by determining a color change within droplet 78. The reaction can then be determined as a function of time, and/or as a function of the distance traveled in the channel (e.g., if the droplets move through channel at a constant and/or determinable or predictable rate). The term "determining," as used herein, generally refers to the analysis or measurement of a species, for example, quantitatively or qualitatively, or the detection of the presence or absence of the species. "Determining" may also refer to the analysis or measurement of an interaction between two or more species, for example, quantitatively or qualitatively, or by detecting the presence or absence of the interaction. Example determination techniques include, but are not limited to, spectroscopy such as infrared, absorption, fluorescence, UV/visible, FTIR ("Fourier Transform Infrared Spectroscopy"), or Raman; gravimetric techniques; ellipsometry; piezoelectric measurements; immunoassays; electrochemical measurements; optical measurements such as optical density measurements; circular dichroism; light scattering measurements such as quasielectric light scattering; polarimetry; refractometry; turbidity measurements; etc.

In one embodiment, a reaction involving a fluidic droplet may be halted and/or prevented from occurring or being completed. For example, counter-revolutionary flow within the droplet may prevent the reaction from occurring or being completed (e.g., due to separation of fluids involved in the reaction), and/or the droplet may be "fixed" or immobilized (for example, through solidification of at least a portion of the droplet) before the reaction can occur or be completed. As a particular example, a fluidic droplet containing at least two reactants, each contained within a fluidic region of the fluidic droplet, may be dried in some fashion before substantial mixing of the fluids occurs (e.g., through spray-drying, through exposure to increased temperatures, etc.), thus creating a solidified particle containing separate regions therein such that the reactants within each region are not able to react with each other. Thus, one embodiment of the invention provides a stable particle comprising two or more separated components or regions that are reactive with each other, for example, as in a spray-dried particle.

In one set of embodiments, additional reactions or other steps may be performed on a droplet (or other fluidic stream), for instance, before and/or after mixing of two or more droplets to form a coalesced droplet. For instance, in some cases, a fluidic droplet (or a portion thereof, such as a reactant) is reacted in some fashion (for example, with the surrounding carrier fluid and/or an agent contained therein, with light as in a photochemical reaction, etc.) before the fluidic droplet is coalesced with other fluidic droplets. In another example, a fluidic region of a coalesced droplet is reacted in some fashion, for example, with other fluidic region of the coalesced droplet and/or agents contained therein, etc.

Figure 8:
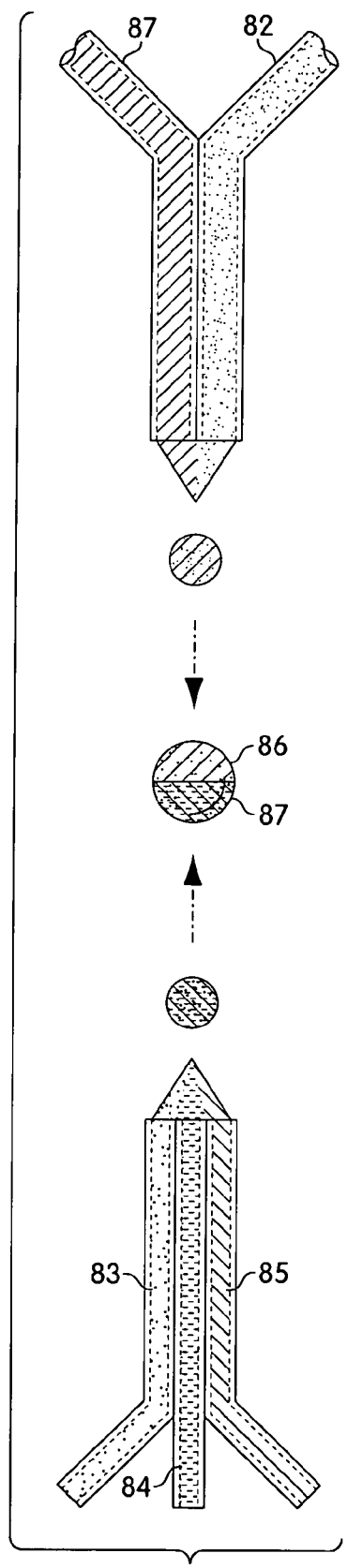
FIG. 8 illustrates droplet coalescence, according to another embodiment of the invention.

Combinations of various techniques, including those described above, may also be used to fabricate more complicated compositions. As an example, in FIG. 8, fluids 81, 82, 83, 84, and 85 are directed in an embodiment of the invention to form a fluidic droplet containing fluid region 86 comprising fluids 81 and 82, and fluid region 87 comprising fluids 83, 84, and 85. The fluidic droplet may further be hardened into a particle in some cases, e.g. as previously described.

Another aspect of the invention relates to discontinuous fluidic streams, such as droplets, that are synchronously produced, i.e., where two or more droplets are produced by two or more fluidic sources (e.g., channel outlets), such that the droplets are each created at the same time. In some cases, the droplets can be fused or coalesced, as described herein. As examples, mechanical techniques may be used to synchronize droplet production, an electric field may be modulated in some fashion to cause synchronous droplet formation, and/or the electrical interaction of the fluids may be used to cause droplet formation from the two channels to be synchronous. One specific example of such a system is illustrated in FIG. 5B, where two water sources 57 each synchronously produce droplets of water 55, 56 in carrier fluid 54 within channels 53.

In one set of embodiments, synchronous droplet production may be achieved through mechanical techniques. For instance, the droplets may be urged to detached from the fluidic sources (e.g., channel outlets) through mechanical forces, shaking, vibration (periodically, or aperiodically in some cases), or similar techniques known to those of ordinary skill in the art. The fluidic source and/or the channels that the droplets enter may be mechanically disturbed or agitated in some fashion to synchronize droplet production.

Figure 9A:
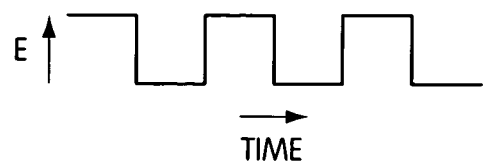
FIGS. 9A-9H illustrate electrical interactions for droplet formation, in accordance with certain embodiments of the invention.
Figure 9B:
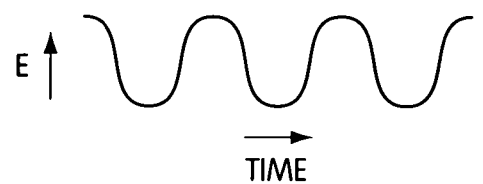
Figure 9C:
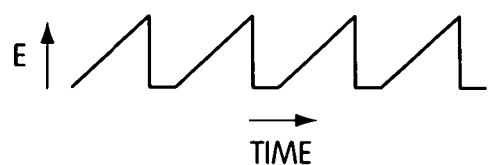

In another set of embodiments, the invention includes a system for electrically synchronizing the release of two or more droplets from two or more channels. For instance, an electric field that is used to influence droplet production (for instance, to produce droplets that are highly charged or essentially saturated in charge, e.g., as in a Taylor cone) may be modulated in some fashion ("dithered") to synchronize droplet production. In one embodiment, the electric field may be modulated with an AC field, for instance, an AC field (which may be an offset AC field in some cases, i.e., the average of the AC field is non-zero). Non-limiting examples of modulating AC fields are illustrated in FIGS. 9A-9C. In FIG. 9A, a square wave pulse is used to modulate the applied electric field, while in FIG. 9B, a sine wave offset is used to modulate the applied electric field, and in FIG. 9C, a sawtooth wave is used to modulate the applied electric field. Other suitable electrical modulations (which may be periodic or aperiodic) can be readily identified by those of ordinary skill in the art. The modulations in the electric field may cause the forming droplets to experience increased electrical forces, which may thus cause the droplets to synchronously detach from the channel.

In yet another set of embodiments, two (or more) channels are positioned such that an electrical interaction occurs between the droplets forming on the two channels. An example of such embodiments is schematically illustrated in FIGS. 9D-9G. In FIG. 9D, droplet 91 and droplet 92, each forming from respective channels 93 and 94, are positioned, separated by a distance 95, such that an electrical interaction is able to occur between them, i.e., the droplets are positioned such that an electrical characteristic of one droplet, such as the charge, affects physical and/or electrical characteristics of the other droplet, for example, the shape of the other droplet. In this embodiment, droplet 91 and droplet 92 each have opposing electrical charges, such that the droplets experience an attractive force towards each other. As the droplets grow in size (FIGS. 9E and 9F), the distance 95 between the droplets decreases, resulting in increased electrical interaction between the droplets as the distance shortens. At some point (illustrated in FIG. 9G), the interaction between the two forming droplets is such that the attractive force causes the droplets to detach from the channels.

Figure 9H:
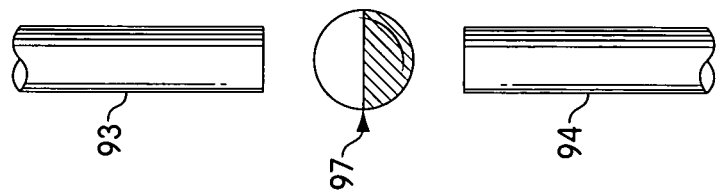
Figure 9G:
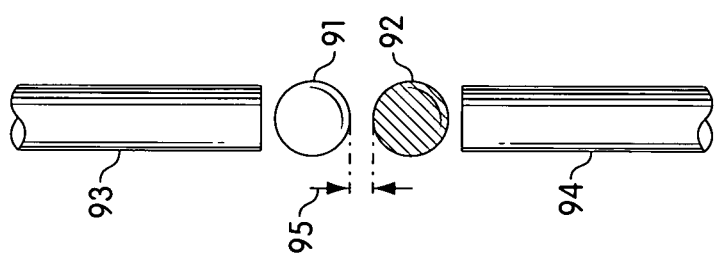
Figure 9F:
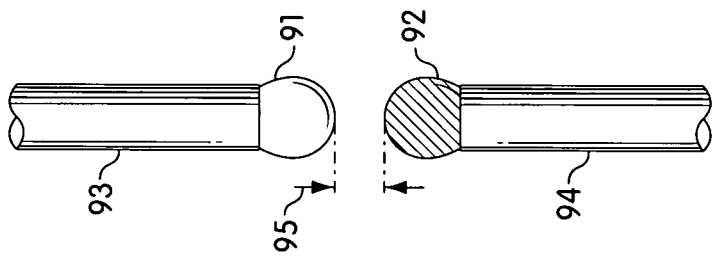
Figure 9E:
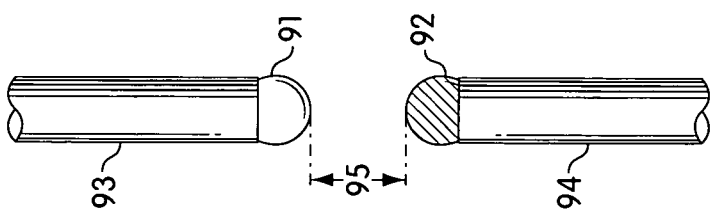
Figure 9D:
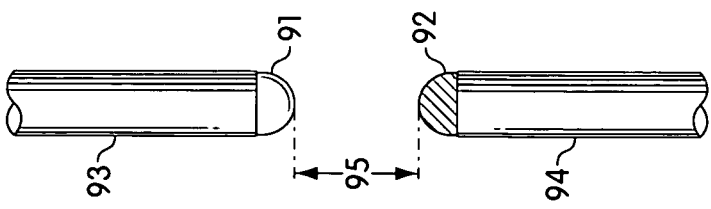

In certain cases, the two droplets may then be allowed to fuse or coalesce, as is schematically illustrated in FIG. 9H, where droplet 91 and droplet 92 have been fused to form droplet 97. One specific example is illustrated in FIG. 5D, where two water sources 57 each synchronously produce oppositely charged droplets of water 55, 56 within channels 53 that fuse, forming droplets 57.

Figure 10A:
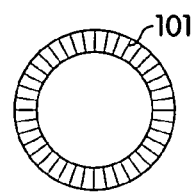
FIGS. 10A-10C illustrate articles that can be produced using certain embodiments of the invention.
Figure 10B:
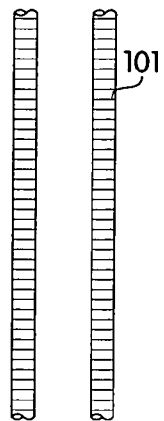
Figure 10C:
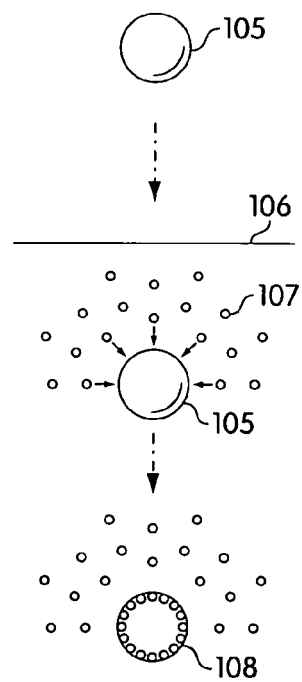

Another aspect of the invention generally relates to articles that can be produced using any of the systems or methods described herein. For instance, in one set of embodiments, a fluidic stream (e.g., a droplet or a tube) may include aligned molecules, i.e., molecules substantially alignable by an electric field, for example, as is shown in FIG. 10 with molecules 101 in a droplet (FIG. 10A) or a tube (FIG. 10B). Non-limiting examples of alignable molecules include charged molecules, molecules having a dipole moment, etc. The molecules may be aligned due to the presence of the electric field, i.e., in the absence of an electric field, the molecules would assume a random configuration or orientation. In some embodiments, the molecules are aligned due to the charge of the fluidic stream; i.e., the fluidic stream, when formed, may be highly charged or essentially saturated in charge. The charge can cause the molecules to become aligned, e.g., during formation of the fluidic stream. In certain instances, the tube or droplet formed may subsequently be hardened or otherwise immobilized in some fashion (e.g., using a chemical reaction, polymerization, drying, etc.) such that the molecules remain substantially aligned.

In another set of embodiments, the invention generally relates to an emulsion. The emulsion may include droplets, such as those described above, and/or colloid particles. As used herein, an "emulsion" is given its ordinary meaning as used in the art, i.e., a liquid dispersion. In some cases, the emulsion may be a "microemulsion" or a "nanoemulsion," i.e., an emulsion having a dispersant on the order of microns or nanometers, respectively. The dispersion or emulsion, in some cases, may include droplets having a homogenous distribution of diameters, i.e., the droplets may have a distribution of diameters such that no more than about 10%, about 5%, about 3%, about 1%, about 0.03%, or about 0.01% of the droplets have an average diameter greater than about 10%, about 5%, about 3%, about 1%, about 0.03%, or about 0.01% of the average diameter of the droplets. As one example, such an emulsion may be created by allowing fluidic droplets of the appropriate size or sizes (e.g., created as described herein) to enter into a solution that is immiscible with the fluidic droplets.

The formation of the emulsion can be controlled by those of ordinary skill in the art, based on the teachings herein, as well as available teachings in the field known to those of ordinary skill in the art, for example, flow-focusing. Reference can be made, for example, to Ganan-Calvo, et al., "Generation of Steady Liquid Microthreads and Micron-Sized Monodispersed Sprays and Gas Streams," *Phys. Rev. Lett.*, 80:2 (Jan. 12, 1998), as well as numerous other texts, for the selection of fluids to carry out the purposes of the invention. Control of the entering fluid flow rate, and/or the ratio between the flow rates of dispersing and subject fluids, can be used to control the subject fluidic stream and/or droplet size, and monodispersity versus polydispersity in the final emulsion, in some cases.

The invention, in yet another set of embodiments, generally relates to fluidic streams containing lipids, for instance, liposomes, lipid tubes, etc. In one embodiment, a lipid fluidic stream, such as a tube or a droplet, can be produced in an aqueous or hydrophobic carrier fluid, e.g., using any of the systems and methods described herein. In another embodiment, a lipid tube may be produced by stretching a liposome or a lipid droplet.

In some embodiments, the invention provides systems and methods for producing colloidosomes, for example, as described in International Patent Application No. PCT/US01/46181, filed May 25, 2001, entitled "Methods and Compositions for Encapsulating Active Agents," by Weitz, et al., published as Publication No. WO 02/47665 on Jun. 20, 2002, incorporated herein by reference. In one embodiment, a charged fluidic droplet is directed at a solution comprising colloids, which colloids may be oppositely charged. Charge interaction of the droplet with the colloids may cause the colloids to collect on the surface of the droplet, thereby forming a colloidosome in solution. An example of this process can be seen in FIG. 10C, where an electrically charged fluidic droplet 105 is directed at a solution 106 containing colloids 107. Colloids 107 may be oppositely charged relative to fluidic droplet 105. The electrical attraction between fluidic droplet 105 and colloids 107 may cause the colloids 107 to be attracted to the surface of fluidic droplet 105, thereby forming colloidosome 108. In some cases, the fluidic droplet may also be hardened into particle, e.g. as previously described.

Any of the above-described embodiments can be used in a variety of applications, for example, medicine (e.g., pharmaceuticals), skin care products (e.g. lotions, shower gels), foods (e.g. salad dressings, ice cream), ink encapsulation, micro-templating of micro-engineered materials (e.g., photonic crystals, smart materials, etc.), and the like. Additionally, in some cases, any of the above-described fluidic streams (e.g., droplets or tubes) may include cells or therapeutic agents. In some applications, highly monodisperse and/or concentrated liquid crystal and/or precipitated droplets may also self-organize into two and three dimensional structures, for example, for use in novel optical devices.

A variety of materials and methods can be used to form certain components of the invention, according to yet another aspect. In some cases various materials selected lend themselves to various methods. For example, components of the invention can be formed from solid materials, in which the channels can be formed via micromachining, film deposition processes such as spin coating and chemical vapor deposition, laser fabrication, photolithographic techniques, etching methods including wet chemical or plasma processes, and the like. See, for example, Angell, et al., *Scientific American*, 248:44-55 (1983). In one embodiment, at least a portion of the system is formed of silicon by etching features in a silicon chip. Technology for precise and efficient fabrication of devices of the invention from silicon is known. In another embodiment that section (or other sections) can be formed of a polymer, and can be an elastomeric polymer, or polytetrafluoroethylene (PTFE; Teflon®), or the like.

Different components can be fabricated of different materials. For example, a base portion including a bottom wall and side walls can be fabricated from an opaque material such as silicon or polydimethylsiloxane (PDMS), and a top portion can be fabricated from a transparent material such as glass or a transparent polymer, for observation and control of the fluidic process. Some components can be coated so as to expose a desired chemical functionality to fluids that contact interior channel walls, where base supporting material does not have the precise, desired functionality. For example, components can be fabricated as illustrated, with interior channel walls coated with another material.

The material used to fabricate devices of the invention, or material used to coat interior walls of fluid channels, may desirably be selected from among those materials that will not adversely affect or be affected by fluid flowing through the device, e.g., material(s) that is chemically inert in the presence of fluids to be used within the device.

In one embodiment, components of the invention are fabricated from polymeric and/or flexible and/or elastomeric materials, and can be conveniently formed of a hardenable fluid, facilitating fabrication via molding (e.g. replica molding, injection molding, cast molding, etc.). The hardenable fluid can be essentially any fluid that can be induced to solidify, or that spontaneously solidifies, into a solid capable of containing and transporting fluids. In one embodiment, the hardenable fluid comprises a polymeric liquid or a liquid polymeric precursor (i.e. a "prepolymer"). Suitable polymeric liquids can include, for example, thermoplastic polymers, thermoset polymers, or mixture of such polymers heated above their melting point; or a solution of one or more polymers in a suitable solvent, which solution forms a solid polymeric material upon removal of the solvent, for example, by evaporation. Such polymeric materials, which can be solidified from, for example, a melt state or by solvent evaporation, are well known to those of ordinary skill in the art. A variety of polymeric materials, many of which are elastomeric, are suitable, and are also suitable for forming molds or mold masters for producing components of the invention, for embodiments where one or both of the mold masters is composed of an elastomeric material. A non-limiting list of examples of such polymers includes polymers of the general classes of silicone polymers, epoxy polymers, and acrylate polymers. Epoxy polymers are characterized by the presence of a three-membered cyclic ether group commonly referred to as an epoxy group, 1,2-epoxide, or oxirane. For example, diglycidyl ethers of bisphenol A can be used, in addition to compounds based on aromatic amine, triazine, and cycloaliphatic backbones. Another example includes the well-known Novolac polymers. Examples of silicone elastomers suitable for use according to the invention include those formed from precursors including the chlorosilanes such as methylchlorosilanes, ethylchlorosilanes, and phenylchlorosilanes, and the like.

Silicone polymers are preferred in one set of embodiments, for example, the silicone elastomer polydimethylsiloxane (PDMS). Exemplary polydimethylsiloxane polymers include those sold under the trademark Sylgard by Dow Chemical Co., Midland, Mich., and particularly Sylgard 182, Sylgard 184, and Sylgard 186. Silicone polymers including PDMS have several beneficial properties simplifying fabrication of the microfluidic structures of the invention. First, such materials are inexpensive, readily available, and can be solidified from a prepolymeric liquid via curing with heat. For example, PDMSs are typically curable by exposure of the prepolymeric liquid to temperatures of about, for example, 65° C. to about 75° C. for exposure times of about, for example, 1 hour. Second, silicone polymers, such as PDMS, are elastomeric and are thus useful for forming very small features with relatively high aspect ratios, necessary in certain embodiments of the invention. Flexible (e.g. elastomeric) molds or masters can be advantageous in this regard.

Another advantage of forming structures such as microfluidic structures of the invention from silicone polymers, such as PDMS, is the ability of such polymers to be oxidized, for example by exposure to an oxygen-containing plasma such as an air plasma, so that the oxidized structures contain at their surface chemical groups capable of cross-linking to other oxidized silicone polymer surfaces or to the oxidized surfaces of a variety of other polymeric and non-polymeric materials. Thus, components can be fabricated and then oxidized and essentially irreversibly sealed to other silicone polymer surfaces, or to the surfaces of other substrates reactive with the oxidized silicone polymer surfaces, without the need for separate adhesives or other sealing means. In most cases, sealing can be completed simply by contacting an oxidized silicone surface to another surface without the need to apply auxiliary pressure to form the seal. That is, the pre-oxidized silicone surface acts as a contact adhesive against suitable mating surfaces. Specifically, in addition to being irreversibly sealable to itself, oxidized silicone such as oxidized PDMS can also be sealed irreversibly to a range of oxidized materials other than itself including, for example, glass, silicon, silicon oxide, quartz, silicon nitride, polyethylene, polystyrene, glassy carbon, and epoxy polymers, which have been oxidized in a similar fashion to the PDMS surface (for example, via exposure to an oxygen-containing plasma). Oxidation and sealing methods useful in the context of the present invention, as well as overall molding techniques, are described in Duffy, et al., "Rapid Prototyping of Microfluidic Systems and Polydimethylsiloxane," *Analytical Chemistry*, 70:474-480 (1998), incorporated herein by reference.

Another advantage to forming microfluidic structures of the invention (or interior, fluid-contacting surfaces) from oxidized silicone polymers is that these surfaces can be much more hydrophilic than the surfaces of typical elastomeric polymers (where a hydrophilic interior surface is desired). Such hydrophilic channel surfaces can thus be more easily filled and wetted with aqueous solutions than can structures comprised of typical, unoxidized elastomeric polymers or other hydrophobic materials.

In one embodiment, a bottom wall is formed of a material different from one or more side walls or a top wall, or other components. For example, the interior surface of a bottom wall can comprise the surface of a silicon wafer or microchip, or other substrate. Other components can, as described above, be sealed to such alternative substrates. Where it is desired to seal a component comprising a silicone polymer (e.g. PDMS) to a substrate (bottom wall) of different material, it is preferred that the substrate be selected from the group of materials to which oxidized silicone polymer is able to irreversibly seal (e.g., glass, silicon, silicon oxide, quartz, silicon nitride, polyethylene, polystyrene, epoxy polymers, and glassy carbon surfaces which have been oxidized). Alternatively, other sealing techniques can be used, as would be apparent to those of ordinary skill in the art, including, but not limited to, the use of separate adhesives, thermal bonding, solvent bonding, ultrasonic welding, etc.

The following example is intended to illustrate certain aspects of certain embodiments of the present invention, but does not exemplify the full scope of the invention.

EXAMPLE

In this example, a device of the invention was used for the application of an electric field at a junction between two immiscible fluids. The electric field created charged droplets and large forces necessary for emulsification, while the junction stabilized droplet production even at high fields, when a Taylor cone was present. Applications of this technology include, but are not limited to, the generation of charged droplets with a narrow distribution in radius down to submicron sizes and controlled droplet coalescence by oppositely charged droplets.

Figure 11A:
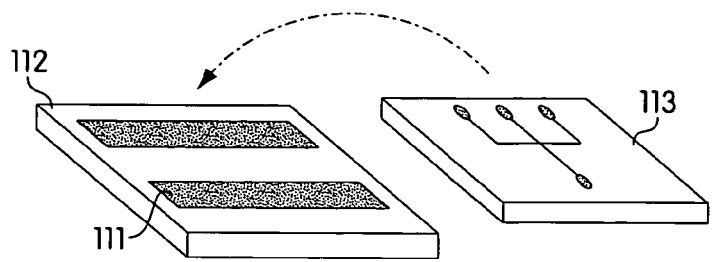
Figure 11B:
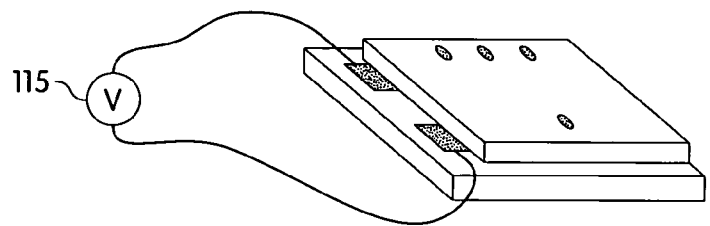
Figure 11C:
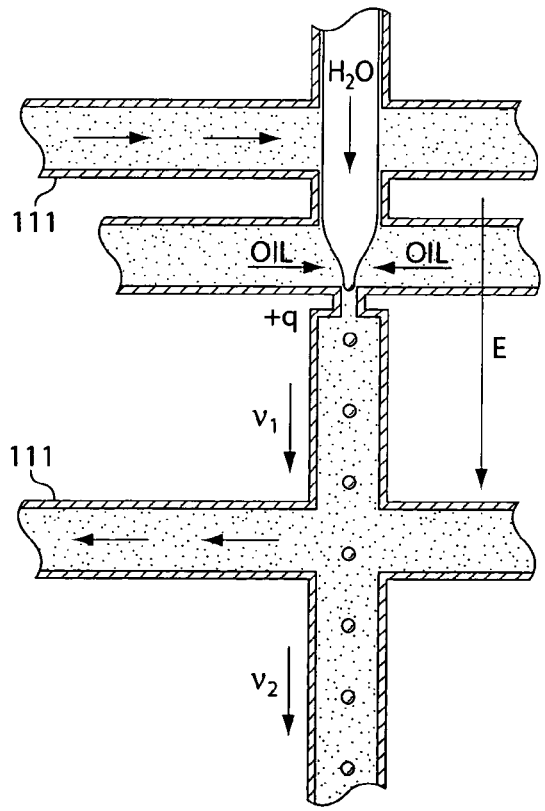

The device of this example was created by patterning PDMS 113 on a glass substrate 112 having electrodes 111 formed from indium tin oxide ("ITO") (FIG. 11A), forming the structure schematically shown in FIG. 11B. A voltage difference 115 was applied to the electrodes (FIG. 11B) to create an applied electric field (FIG. 11C). The device included a two-fluid injection system where a conductive fluid was injected into a non-conductive fluid in the presence of the electric field to generate droplets of the conductive fluid dispersed in the non-conductive fluid. Droplets could be created having diameters of less than about 1 micron to about 100 microns. These droplets remain charged with the sign of the charge dependent on the sign of the electric field with respect to the direction of flow, as is shown in FIG. 11C.

Images of droplets generated by this device are shown in FIGS. 11D-11I. In the absence of an electric field, as illustrated in FIGS. 11D-11G, large droplets were generated, while in the presence an electric field (E=2 V/micron), a Taylor cone was stabilized with uniform submicron droplets being emitted from the tip, as shown in FIGS. 11H and 11I. The droplets may also be discharged on a ground electrode located further downstream. Such a device has many applications, for example, in generating well controlled nanoemulsions.

Oppositely oriented devices were also used to generate droplets having opposite sign of charge. Using this charge, the droplets coalesced at a precise or generally predetermined location, as is shown in FIGS. 5B and 5D. In FIG. 5B, there is no electric field applied and the droplets did not coalesce. In FIG. 5E-5G, the electrostatic attraction can cause the drops to coalesce. The electric field, in some cases, can be used to control the phase between when the droplets are generated to ensure simultaneous arrival at a central location and subsequent coalescence, for example, through an auto feedback mechanism or a using an AC dither. As shown in FIGS. 6A-6D, the surface of the droplets could be deformed and electrostatic forces may overcome surface tension to produce a fluid bridge to coalesce and/or neutralize the droplets.

While several embodiments of the present invention have been described and illustrated herein, those of ordinary skill in the art will readily envision a variety of other means and/or structures for performing the functions and/or obtaining the results and/or one or more of the advantages described herein, and each of such variations and/or modifications is deemed to be within the scope of the present invention. More generally, those skilled in the art will readily appreciate that all parameters, dimensions, materials, and configurations described herein are meant to be exemplary and that the actual parameters, dimensions, materials, and/or configurations will depend upon the specific application or applications for which the teachings of the present invention is/are used. Those skilled in the art will recognize, or be able to ascertain using no more than routine experimentation, many equivalents to the specific embodiments of the invention described herein. It is, therefore, to be understood that the foregoing embodiments are presented by way of example only and that, within the scope of the appended claims and equivalents thereto, the invention may be practiced otherwise than as specifically described and claimed. The present invention is directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the scope of the present invention.

All definitions, as defined and used herein, should be understood to control over dictionary definitions, definitions in documents incorporated by reference, and/or ordinary meanings of the defined terms.

It should also be understood that, unless clearly indicated to the contrary, in any methods claimed herein that include more than one act, the order of the acts of the method is not necessarily limited to the order in which the acts of the method are recited.

In the claims, as well as in the specification above, all transitional phrases such as "comprising," "including," "carrying," "having," "containing," "involving," "holding," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

What is claimed is:

1. A method of producing a plurality of droplets, comprising:

flowing a first liquid in a first microfluidic channel and a second liquid in a second microfluidic channel such that the first and the second liquids meet at a junction of the first and second microfluidic channels; and producing a plurality of regularly-spaced, single-file droplets comprising the first liquid at the junction by applying an electric field to the first and second liquids as they meet at the junction, wherein the droplets are surrounded by the second liquid and flow within at least one of the microfluidic channels.

2. The method of claim 1, wherein said first liquid is an aqueous liquid and said second liquid is a liquid that is immiscible in said aqueous liquid.

3. The method of claim 1, wherein said droplets have an average diameter of less than about 60 microns.

4. The method of claim 1, wherein said first microfluidic channel and said second microfluidic channel are contained on a device comprising a location for expelling said droplets.

5. The method of claim 1, further comprising the step of conducting a reaction in said droplets.

6. The method of claim 1, wherein said first liquid forms a Taylor cone when expelled from an outlet in said first microfluidic channel.

7. The method of claim 6, wherein the first and second liquids flow through a dimensional restriction that stabilizes the Taylor cone.

8. The method of claim 1, wherein the droplets comprise a homogeneous distribution of diameters.

* * * * *